United States Patent [19]
Whiting et al.

[11] Patent Number: 5,778,395
[45] Date of Patent: *Jul. 7, 1998

[54] SYSTEM FOR BACKING UP FILES FROM DISK VOLUMES ON MULTIPLE NODES OF A COMPUTER NETWORK

[75] Inventors: Douglas L. Whiting, Carlsbad; Tom Dilatush, Chula Vista, both of Calif.

[73] Assignee: Stac, Inc., Carlsbad, Calif.

[*] Notice: This patent issued on a continued prosecution application filed under 37 CFR 1.53(d), and is subject to the twenty year patent term provisions of 35 U.S.C. 154(a)(2).

[21] Appl. No.: 546,727

[22] Filed: Oct. 23, 1995

[51] Int. Cl.⁶ .................................................. G06F 17/30
[52] U.S. Cl. ........................................... 707/204; 707/10
[58] Field of Search ............................... 395/601, 610, 395/616, 620, 621, 489, 575, 182.03, 700, 618; 380/50, 49; 341/106; 707/204, 10

[56] References Cited

U.S. PATENT DOCUMENTS

| | | | |
|---|---|---|---|
| 5,008,936 | 4/1991 | Hamilton et al. | 380/50 |
| 5,123,047 | 6/1992 | Rosenow | 380/50 |
| 5,126,739 | 6/1992 | Whiting et al. | 341/105 |
| 5,133,065 | 7/1992 | Cheffetz et al. | 395/575 |
| 5,163,148 | 11/1992 | Walls | 707/204 |
| 5,175,766 | 12/1992 | Hamilton | 380/49 |
| 5,193,154 | 3/1993 | Kitajima et al. | 707/204 |
| 5,276,867 | 1/1994 | Kenley et al. | 707/204 |
| 5,301,286 | 4/1994 | Rajani | 711/202 |
| 5,386,545 | 1/1995 | Gombos, Jr. et al. | 707/204 |
| 5,414,850 | 5/1995 | Whiting | 395/700 |
| 5,446,888 | 8/1995 | Pyne | 707/10 |
| 5,448,718 | 9/1995 | Cohn et al. | 711/4 |
| 5,479,654 | 12/1995 | Squibb | 707/201 |
| 5,495,607 | 2/1996 | Pisello et al. | 395/600 |
| 5,515,502 | 5/1996 | Wood | 395/182.13 |
| 5,537,533 | 7/1996 | Staheli et al. | 395/182.03 |
| 5,537,585 | 7/1996 | Blickenstaff et al. | 395/600 |
| 5,546,534 | 8/1996 | Malcolm | 395/182.04 |
| 5,548,750 | 8/1996 | Larson et al. | 707/204 |
| 5,559,991 | 9/1996 | Kanfi | 395/489 |
| 5,596,706 | 1/1997 | Shimazaki et al. | 395/182.04 |
| 5,615,364 | 3/1997 | Marks | 707/202 |
| 5,642,505 | 6/1997 | Fushimi | 707/204 |
| 5,664,186 | 9/1997 | Bennett et al. | 707/204 |

FOREIGN PATENT DOCUMENTS

| | | |
|---|---|---|
| 0466389 | 7/1991 | European Pat. Off. |
| 0541281 | 10/1992 | European Pat. Off. |
| 0650122 | 10/1992 | European Pat. Off. |
| 9417474 | 8/1994 | WIPO |

*Primary Examiner*—Thomas G. Black
*Assistant Examiner*—Frantz Coby
*Attorney, Agent, or Firm*—Irell & Manella LLP

[57] ABSTRACT

A system for backing up files from disk volumes on multiple nodes of a computer network to a common random-access backup storage means. As part of the backup process, duplicate files (or portions of files) may be identified across nodes, so that only a single copy of the contents of the duplicate files (or portions thereof) is stored in the backup storage means. For each backup operation after the initial backup on a particular volume, only those files which have changed since the previous backup are actually read from the volume and stored on the backup storage means. In addition, differences between a file and its version in the previous backup may be computed so that only the changes to the file need to be written on the backup storage means. All of these enhancements significantly reduce both the amount of storage and the amount of network bandwidth required for performing the backup. Even when the backup data is stored on a shared-file server, data privacy can be maintained by encrypting each file using a key generated from a fingerprint of the file contents, so that only users who have a copy of the file are able to produce the encryption key and access the file contents. To view or restore files from a backup, a user may mount the backup set as a disk volume with a directory structure identical to that of the entire original disk volume at the time of the backup.

24 Claims, 11 Drawing Sheets

```
200.  <volumeDirInfo>     ::= <subdirFileList>* [<externDirItem>]*
201.  <subdirFileList>    ::= [<fileEntry> | <subdirEntry>]* <endOfList> <externCount>
202.  <endOfList>         ::= 0x00                              // zero byte marks end of list
203.  <externCount>       ::= <itemCount>                       // references <externDirItems>
204.  <itemCount>         ::= <itemCount8> | <itemCount16>
205.  <itemCount8>        ::= 0x00 .. 0xFE                      // 8-bits: 0..254
206.  <itemCount16>       ::= 0xFF <word>                       // 24-bits: 0..65535
207.  <fileEntry>         ::= <fileName> <fileAttrib> <fileTime> <fileSize> <fileID>
208.  <subdirEntry>       ::= <dirName> <fileAttrib> <fileTime>
209.  <fileAttrib>        ::= 0x00 .. 0xFF                      // attribute bits      for file/dir
210.  <fileTime>          ::= <dword>                           // creation time/date for file/dir
211.  <fileSize>          ::= <dword>                           // size of file in bytes
212.  <fileName>          ::= <asciiz>                          // name of the file
213.  <dirName>           ::= <asciiz>                          // name of the subdirectory
214.  <fileID>            ::= <fileIndex> <userIndex>           // which file, which user
215.  <fileIndex>         ::= <dword>                           // up to 4G files per user
216.  <userIndex>         ::= 0x0000 .. 0xFFFF                  // 16-bit unsigned quantity
218.  <dword>             ::= 0x00000000 .. 0xFFFFFFFF          // 32-bit unsigned quantity
219.  <asciiz>            ::= [0x01 .. 0xFF]* 0x00              // zero-terminated char string
220.  <externDirItem>     ::= <oneItem> | <manyItems>           // unchanged dir entries
221.  <oneItem>           ::= 0 <dirItemNum>                    // total of 32 bits
222.  <manyItems>         ::= 1 <dirItemNum> <itemCount>        // total of 32 bits + itemCount
223.  <dirItemNum>        ::= 0x00000001 .. 0x7FFFFFFF          // dir item number: 31 bits
```

FIG. 4

```
300.    FA_DIREC    =    20h        ; bit 5 of attribute byte ==> directory
301.
302.    ;<volumeDirInfo>: a small example illustrating the format of Figure 4
303.    ;<subdirFileList> for root directory:
304.        db    'DIR1',0        ; <subdirEntry>:<dirName>: \DIR1
305.        db    FA_DIREC        ;               <fileAttrib> for subdir
306.        dd    (?)             ;               <fileTime>   for subdir
307.        db    'DIR2',0        ; <subdirEntry>:<dirName>:  \DIR2
308.        db    FA_DIREC        ;               <fileAttrib> for subdir
309.        dd    (?)             ;               <fileTime>   for subdir
310.        db    'FILE1',0       ; <fileEntry>   <fileName>:\FILE1
311.        db    0               ;               <fileAttrib> for file
312.        dd    (?)             ;               <fileTime>   for file
313.        dd    25000           ;               <fileSize>
314.        dd    1387            ;               <fileID>:<fileIndex>=1387
315.        dw    17              ;                        <userIndex>=17
316.        db    0               ; <endOfList>
317.        db    1               ; <externCount> = 1 (item 29)
318.    ;    <subdirFileList> for \DIR2:
319.        db    'SUBDIR_A',0    ; <subdirEntry>:<dirName>: \DIR2\SUBDIR_A
320.        db    FA_DIREC        ;               <fileAttrib> for subdir
321.        dd    (?)             ;               <fileTime>   for subdir
322.        db    'FILE2',0       ; <fileEntry>:  <fileName>:\DIR2\FILE2
323.        db    0               ;               <fileAttrib> for file
```

FIG. 5-1

```
324.         dd(?)                    ; <fileTime> for file
325.         dd    10000              ; <fileSize>
326. dd1395; <fileID>:<fileIndex>>=1395
327.         dw    17                 ; <userIndex>>=17
328.         db    0                  ; <endOfList>
329.         db    2                  ; <externCount> = 2 (items 73,75)

330. ; <subdirFileList> for \DIR2\SUBDIR_A:
331.         db    'FILE4',0          ; <fileEntry>:<fileName>:\DIR2\FILE3
332.         db    0                  ; <fileAttrib> for file
333.         dd    (?)                ; <fileTime> for file
334.         dd    1                  ; <fileSize>
335.         dd    233                ; <fileID>:<fileIndex>>= 233
336.         dw    1                  ; <userIndex>>= 1
337.         db    0                  ; <endOfList>
338.         db    0                  ; <externCount> = 0 (no items)

339. ; <subdirFileList> for \DIR1:
340.         db    'SUBDIR_B',0       ; <subdirEntry>:<dirName>: \DIR1\SUBDIR_B
341.         db    FA_DIREC           ; <fileAttrib> for subdir
342.         dd    (?)                ; <fileTime> for subdir
343.         db    'FILE3',0          ; <fileEntry>:<fileName>:\DIR1\FILE3
344.         db    0                  ; <fileAttrib> for file
345.         dd    (?)                ; <fileTime> for file
346.         dd    0                  ; <fileSize> = 0 (no data)
347.         dd    0                  ; <fileID>:<fileIndex>>=NULL
```

*FIG. 5-2*

```
348.    dw   0                          ;    <userIndex>=NULL
349.    db   0                          ;    <endOfList>
350.    db   3                          ;    <externCount> = 3 (items 81,83,87)

351.    ; <subdirFileList> for \DIR1\SUBDIR_B:
352.    db   0                          ;    <endOfList>: no explicit entries here
353.    db   2                          ;    <externCount> = 2 (items 91,93-95)
354.    ; end of all <subdirFileList> records
355.
356.    ;<externDirItems>:
357.    dd   29                         ;    <oneItem> : root dir
358.    dd   73,75                      ;    <oneItem>*: \DIR2
359.    dd   81,83,87; <oneItem>*: \DIR1
360.    dd   91                         ;    <oneItem> : \DIR2\SUBDIR_B
361.    dd   93+80000000H                    <manyItems>: <baseItemNum>=93
362.    db   3                               <itemCnt>=3  (#93-95)
```

FIG. 5-3

```
400. <bkupDataFile>      ::= <header> <dataBlock>* <fileInfo>* <fInfoPtrs>
401. <header>            ::= ... <fInfoPtrOffset> <indexRangeCnt> ...
402. <fInfoPtrOffset>    ::= <dword>                          // where to find fInfoPtrs in file
403. <indexRangeCnt>     ::= <dword>                          // # indexRange entries
404.
405. <dataBlock>         ::= <byte>*                          // starts dword aligned in file
406. <byte>              ::= 0x00 .. 0xFF                     // 8-bit bytes
407.
408. <fileInfo>          ::= <fileCRC> <bitFields> <seekPts> [<fileRef>*] <fprints>
409. <fileCRC>           ::= <dword>                          // CRC over entire file contents
410. <bitFields>         ::= <refCnt> <refLevel> <isGlobal>
411. <refCnt>            ::= 00 | 01 | 10                     // two bits: # referenced files
412. <refLevel>          ::= 0x00 .. 0x3F                     // max # ref levels of indirection
413. <isGlobal>          ::= 0 | 1                            // boolean: new/updated file?
414. <seekPts>           ::= <seekPtCount> <seekPoint>*       // how to find data blocks of file
415. <seekPtCount>       ::= <dword>                          // # seekpoints in fileInfo
416. <seekPoint>         ::= <logicalOffset> <dataPtr>        // binary search on logicalOffset
417. <logicalOffset>     ::= <dword>                          // logical file offset of block
418. <dataPtr>           ::= <dataBlockPtr> | <externPtr>     // internal/external ptr (32-bits)
419. <dataBlockPtr>      ::= <blockOffs> 0 <packFlag>         // reference internal data block
```

*FIG. 7-1*

```
420. <externPtr>       ::= <relOffs> 1 <refFileNo>            // reference external file
421. <blockOffs>       ::= <bits30>                           // offset of dataBlock in dwords
422. <packFlag>        ::= 0 | 1                              // boolean: raw/compressed block?
423. <relOffs>         ::= <bits30>                           // signed relative logical offset
424. <refFileNo>       ::= 0 | 1                              // which reference file?
425. <bits30>          ::= 0x00000000 .. 0x3FFFFFFF           // 30 bit field (part of a dword)
426. <fileRef>         ::= <fileID> <decryptKey>              // which file, how to decrypt it
427. <decryptKey>      ::= <dword> <dword>                    // 64-bit private encryption key
428. <fprints>         ::= <fpChunkSize> <fingerPrint>*       // for chunk matching
429. <fpChunkSize>     ::= <word>                             // # bytes covered by fingerprint
430. <fingerPrint>     ::= <dword> <dword> <dword>            // 96 bits as chunk signature
431.
432. <fInfoPtrs>       ::= <indexRange>* <fileInfoData>*
433. <indexRange>      ::= <indexBase> <indexCount>           // # indexRange entries in header
434. <indexBase>       ::= <dword>                            // first file index in range
435. <indexCount>      ::= <dword>                            // # indices in this range
436. <indexCount>      ::= <dword>
437. <fileInfoPtr>     ::= <fileInfoPtr> <fileSize> <dirInfoCRC> <partialFileCRC>
438. <fileSize>        ::= <dword>                            // offset of <fileInfo> record
438. <fileSize>        ::= <dword>                            // file size in bytes
439. <dirInfoCRC>      ::= <dword>                            // CRC over file directory entry
440. <partialFileCRC>::= <dword>                              // CRC over first 256K of file
```

FIG. 7-2

SYSTEM FOR BACKING UP FILES FROM DISK VOLUMES ON MULTIPLE NODES OF A COMPUTER NETWORK

FIELD OF THE INVENTION

The present invention relates to a system for allowing multiple nodes on a computer network to backup files to a common random-access backup storage means.

BACKGROUND OF THE INVENTION

Backing up data and program files (often together referred to as "data" here) from computer disks has been a well known practice for many years. There are two major reasons why data needs to be backed up. The first reason is that the disk hardware may fail, resulting in an inability to access any of the valuable data stored on the disk. This disastrous type of event is often referred to as a catastrophic failure; in this case, assuming that backups have been performed, the computer operator typically "restores" all his files from the most recent backup. Fortunately, new computer disks and controllers have become more reliable over the years, but the possibility of such a disaster still cannot be ignored. The second reason for backup is that users may inadvertently delete or overwrite important data files. This type of problem is usually much more common than a catastrophic hardware failure, and the computer operator typically restores only the destroyed files from the backup medium (e.g., tapes) to the original disk.

In general, the backup device is a tape drive, although floppy disk drives and other removable disk drive technologies (e.g., Bernoulli, Syquest, optical) are also used. Tape has the advantage of having a lower cost per byte of storage (when considering the cost of the media only, ignoring the cost of the drive), and for that reason tape is preferred in most applications, particularly those where large amounts of data are involved, such as network file servers. Tape is primarily a sequential access medium; random accesses, while possible, usually require times on the order of tens of seconds (if not minutes), as opposed to milliseconds for a disk drive. Similarly, the time to stop and restart a moving tape is on the order of seconds, so it is important to supply enough data to keep the tape drive "streaming" in order to insure acceptable backup performance. After a backup is completed, the tape cartridge may be taken off-site for safe keeping. When the need arises to restore data from a given backup, the appropriate tape cartridge is re-inserted into the tape drive, and the user selects the file(s) to be restored, which are in turn retrieved from the tape and written to a disk volume.

The tasks of physically storing the set of tape cartridges in a safe environment and cataloging them to facilitate selection of the tape(s) required for restore are important (and often challenging) functions of both the backup software and the backup administrator (i.e., the individual(s) responsible for implementing the backup process and policy). In addition, if the backup or restore operations involve multiple tapes, the ability to switch between tapes must be provided, either manually by a backup administrator or automatically using a tape jukebox (i.e., a robotic tape autochanger). Switching between tapes thus can involve a considerable direct cost, either for salary or for jukebox robotics, as well as a substantial time delay, normally tens of seconds or more.

In order to save backup time as well as the amount of tape used, various types of "incremental" backup strategies may be employed. For example, a common practice involves performing a full backup of all files on a disk volume once per week, and then backing up only the files that have changed since the last backup on subsequent days of the week. Another variation on this idea is known as "differential" backup, in which each partial backup contains all changes since the last full backup instead of from the previous partial backup; this method guarantees that only two backups (one full and one partial) need to be accessed to restore files as of the time of a particular backup. Since in most cases the amount of data that actually changes on a disk volume per day is a small fraction of the total, such approaches have the advantage of significantly reducing the backup "window", or amount of time required for a backup, on the days when an incremental is performed. Also, it is often possible to fit the data from a full backup and several incremental backups all on a single tape cartridge, obviating the need for any tape switching in the days intervening between full backups. In the case where the disk volume and the tape drive are on separate computers connected over a network, incremental backup also considerably decreases the network bandwidth requirements.

While it is true that incremental backups can save time and media, they are also often much harder to use than full backups. From a user's perspective, the set of files included on each incremental backup is normally quite unrelated to how he views the contents of his disk volume. In other words, although certain files may have changed since the last backup, the disk volume still contains a complete copy of all files, changed and unchanged, any of which may be required to perform a given operation. Unfortunately, the restore software dealing with incremental backups in the prior art typically presents to the user a view of only the changed files, not a merged view of all files present on the disk at the time of the incremental backup. Thus, for example, if a user wishes to restore a given set of files, say an entire subdirectory, as of the date of a given incremental backup, he often will have to restore the files from the previous full backup and then each of the intervening incrementals in order to guarantee the correct "latest" copy of each file. Similarly, if the user wishes to identify a set of files from the backup tapes, he normally must peruse several incremental/full backup sets in order to find all the files of interest. Once the files have been selected, they may very well be spread all over the tape, even if they were all contiguous on the disk and the full backup, thus resulting in a very slow restore process. For these reasons, incremental backup is often used grudgingly at best, and not infrequently it is rejected in favor of always performing full backups.

Another significant limitation in performing restores has to do with how the user may access files stored on the tapes. Restoring files typically involves running a special application, provided as part of the backup software package, that allows the user to select his files and then restore them from tape to a disk volume. Because the user runs the restore application infrequently, it presents an unfamiliar interface to dealing with files and does not allow accessing the files directly with other application programs. Most users already have their own favorite set of applications for viewing and dealing with files, including word processors, file managers, spreadsheets, etc., so the concept of "mounting" the backup image as a pseudo-disk volume to allow the user to view, select, and restore files using his own tools seems attractive and has been implemented in a few cases (e.g., Columbia Data's Snapback product; U.S. Patent Application entitled "SYSTEM FOR BACKING UP COMPUTER DISK VOLUMES," filed Oct. 4, 1995, and assigned to the assignee of the present invention, incorporated herein by reference). However, the inherent slowness of tape in such random access applications makes the usefulness of this concept somewhat limited, and this awkwardness is particularly exacerbated if incremental backups have effectively spread the files out even further on the tape than they would be in a full backup.

For a single standalone computer, the configuration for backup consists of adding a backup device (e.g., tape drive) to the computer. In a networked environment, however, the situation is much more complex, and many configurations have been employed in an attempt to address the intricate tradeoffs in cost, manageability, and bandwidth (both tape and network). Most computer networks include nodes that are file or application servers as well as nodes that are user workstations (e.g., desktop personal computers). Servers generally contain critical data for an entire company or department, so backing up the server(s) is considered an imperative task and is normally handled by a network administrator. It is not uncommon for each server to have a dedicated tape drive for backing up its disk(s), but in many instances a single tape drive may be used to back up multiple servers by sending the backup data over the network. The former approach is more expensive and involves managing tape cartridges at more locations, but it avoids network bandwidth limitations in the latter approach that often make it impossible to keep a high-speed tape drive streaming with data coming over the network. Given the complexities of the various factors involved, including drive cost, media cost, tape drive speed, network bandwidth, frequency of backup, size of hard disks, acceptable range of backup window, etc., it is not surprising that many systems utilize a mixture of approaches that evolves over time as technology progresses.

Personal computer workstations on networks also often contain critical data The amount of such data is increasing as the average workstation disk capacity grows, due to the continuing dramatic decreases in the cost of disk drive capacity. Nonetheless, the data from workstations on most networks today is backed up only sporadically, if at all, despite the availability of several seemingly viable solutions. For example, installing a standalone tape drive on each workstation could solve the problem in theory, but in practice there are many serious obstacles that limit the effectiveness of this approach. Among these problems are drive cost, media cost, end-user training cost, and the difficulty of managing the backup tapes which are necessarily dispersed physically throughout the organization, not to mention the lack of user discipline in regularly performing acceptable backups.

Another method, included as part of almost every network backup software package, allows the workstation data to be backed up over the network to a shared backup device, thus permitting a centralized administration of drives and media and amortizing the hardware cost among many users. However, despite its ready availability, this technique is employed in only a small percentage of installations, for a variety of reasons. For example, it is not uncommon for networks to contain dozens or even hundreds of workstations, in which case there may not be enough network bandwidth to backup all of them in a reasonable window (e.g., overnight). Further, the sheer volume of data involved typically forces the use of a tape jukebox, which greatly increases the cost of hardware and of tape management. Also, there can be conflicts in scheduling the use of the tape drive for each workstation, particularly since there is a need on one hand to provide data at a high enough rate to keep the tape drive streaming, but on the other hand the act of backing up typically slows down user response and network response. One system, patented by Gigatrend in U.S. Pat. No. 5,212,772, worked around part of this problem by interleaving the data from multiple workstations onto a single tape cartridge in an attempt to guarantee that the tape could continue streaming, but this approach met with little commercial success. Perhaps the major obstacle to acceptance is the simple fact that, once a user decides that he needs to restore data from a previous backup of his workstation, he does not have control of the media to select the tape(s) of interest, unless a very large (and expensive) tape jukebox is used and appropriate software is available to manipulate the jukebox remotely. Manually assisting the user in this task rarely rates very high on the priority list of a network administrator, and it may also conflict with other scheduled uses of the tape drive(s); the result is almost invariably that the delay in finally accessing the data to be restored leaves both the end-user and the network administrator frustrated.

With the ever decreasing cost of disk drive capacity, another solution to the workstation backup problem has been recently employed in some networks. The network administrator adds a large disk drive (or set of drives) to a file server on the network, and users simply copy files from their workstations to a subdirectory tree on the new disk. If desired, privacy of the backup data can be insured by assigning standard network security access rights to each user's directory. The files placed on the server are backed up as part of the regular server backup process, providing a second level of data recovery if necessary. Each user can easily access the files from his backup directory on the network using his own preferred applications, without any intervention on the part of the network administrator. Note that this general approach could also be applied to server backup if desired. At current prices, it is possible to add one gigabyte of disk space for each user for a price comparable that of a lowend tape drive; while this solution may be more expensive on a cost per megabyte basis than others discussed here, the cost is nonetheless acceptable in certain environments. This method is not without its problems, such as network bandwidth constraints, need for user discipline in regularly backing up all important files, and inability to retrieve older versions of files without accessing a tape, which typically requires administrator assistance. However, it does overcome some key obstacles which are not easily addressable using a tape-only backup solution.

It is readily observed that most workstations on a network contain many files with identical contents, particularly operating system files, program files, and other files that are distributed as part of software packages, stored on the user's disk, and never modified. It is also seems to be true that the percentage of disk contents occupied by such common files is increasing with time, particularly as disk drive capacity grows and more software is distributed on CD-ROMs. However, observe that none of the prior art backup approaches discussed above take advantage of these phenomena in any way.

SUMMARY OF THE INVENTION

It is the goal of the present invention to overcome many of the problems historically associated with backing up data from multiple nodes on a computer network. In contrast to the prior art, the present invention provides a lower-cost backup solution that simultaneously reduces network bandwidth consumption, decreases the time required for backup and restore, allows for central administration, automates the backup process at user workstations, provides access to all versions of previous files without any administrator intervention, and permits the user to access files from the backup directly using his own applications.

In the present invention, files are backed up from disk volumes on multiple nodes of a computer network to a common random-access backup storage means, typically a disk volume. Backups can be scheduled, either by the user or by the backup administrator, to occur automatically and independently for each node. As part of the backup process, duplicate files (or portions of files) may be identified across nodes, so that only a single copy of the contents of the duplicate files (or portions thereof) is stored in the backup storage means. The preferred embodiment includes a search method for identifying duplicate files that is extremely efficient in its use of network bandwidth even when millions of files have been added to the backup system. For each backup operation after the initial backup on a particular volume, only those files which have changed since the previous backup need to be read from the volume and stored on the backup storage means; pointers to the contents of unmodified files are stored along with the directory information for the backup. In addition, differences between a file and its version in the previous backup may be computed so that only the changes to the file need to be written on the backup storage means, and almost all data written to the backup storage means is compressed using a lossless compression algorithm. Each of these "data reduction" enhancements significantly decreases both the amount of storage and the amount of network bandwidth required for performing the backup. In fact, the data reduction is effective enough in most instances to lower the amount of storage required to the point where the system cost of using disk drives as the backup storage means is less expensive than the cost of conventional tape backup systems in such environments, particularly given the rapidly declining cost of disk storage.

Even when the backup data is stored on an openly accessible shared-file server, data privacy can be maintained by encrypting the contents of each file using an encryption key generated from a hash function of the file contents, so that only users who once backed up a copy of the file are able to produce the encryption key and access the file contents.

To view or restore files from a backup, a user may mount the backup set as a real-time (i.e., with disk access times, not tape access times) temporary disk volume with a directory structure identical to that of the entire original disk volume at the time of the backup. The user may then access the files directly using his own applications, without first having to copy them using a separate restore program. The backup disk volume may be mounted in a read-only mode; alternatively, write access can be provided to allow transient modifications to the files, although all such modifications are normally lost once the backup volume is unmounted.

BRIEF DESCRIPTION OF THE DRAWINGS

A preferred embodiment of the present invention is illustrated in and by the following drawings, in which like reference numerals indicate like parts and in which:

FIG. 4 is a Backus-Naur Form (BNF) description of the format of the directory entries in a backup directory file in accordance with the present invention;

FIG. 5 is an assembly language description of a specific example of the directory entry format defined in FIG. 4;

FIG. 7 is a BNF description of the format of a backup data file in accordance with the present invention;

DETAILED DESCRIPTION OF THE PREFERRED EMBODIMENT

Figure 1:
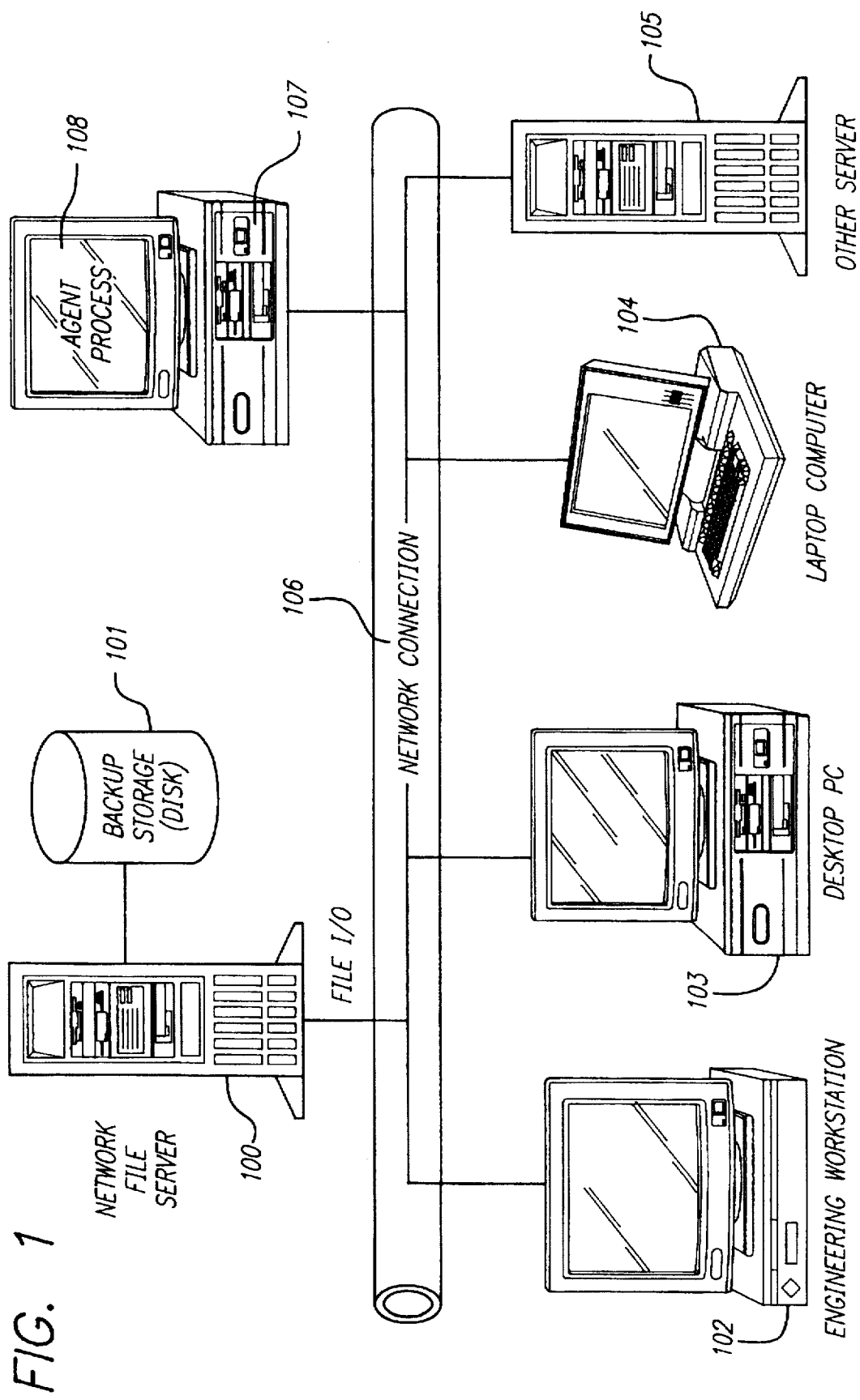
FIG. 1 is a block diagram illustrating a typical network configuration for the backup system of the present invention.

The preferred embodiment of the present invention uses disk space on a network file server (or servers) as its backup storage means. Each client workstation is responsible for copying the backup data to a preassigned location or directory on the file server, as well as for searching the backup "database" to identify duplicate files across users and to compute the differences (or deltas) between file versions. Thus, the preferred embodiment is not truly a client/server system, although certain housekeeping functions essential to performance and security need to be performed by an Agent task, which may run on any network node, including the file server itself.

In an alternate embodiment, the backup storage means consists of disk space on an application server (the backup server). The network nodes communicate with the backup server in a traditional client/server paradigm. The Agent functions are performed by the backup server. This embodiment provides slightly higher security than the preferred embodiment, but it normally costs more because of the need for a separate server, although it may be possible to amortize this cost somewhat if the backup server provides other application services. Such an embodiment also tends to concentrate the computing load (e.g., identifying duplicate files) on the server, which may affect the scalability of this approach, although there are simple ways to distribute more of the computational load across the client nodes if desired, which are readily apparent to those of ordinary skill in the art. There are also many other possible embodiments, consisting of various flavors of hybrids of the file server and application server approaches, which would fall within the scope of the present invention.

In yet another embodiment, the backup storage means incorporates hierarchical storage management (HSM), in which files that have not been accessed for a long time are migrated from disk to a secondary storage means, such as tape or optical disk. The main purpose of HSM is to save on storage costs for very large storage systems by providing the management tools that allow the migration to be transparent to the system, except for the additional delay in accessing some files. Use of any form of HSM in conjunction with the backup storage means of the present invention does not significantly affect any of the concepts discussed here. However, care must be taken not to impair performance of the backup and restore operations, since delays incurred in accessing secondary storage may render the system much less usable. Indeed, it would be fairly simple to identify portions of the contents of backup data and directory files of the present invention which could be migrated to secondary storage without adversely affecting backup performance. Fortunately, in most cases, the data reduction methods of the present invention are sufficiently powerful to keep disk storage costs down to an acceptable level even without using HSM.

1. Backup Process

Figure 2:
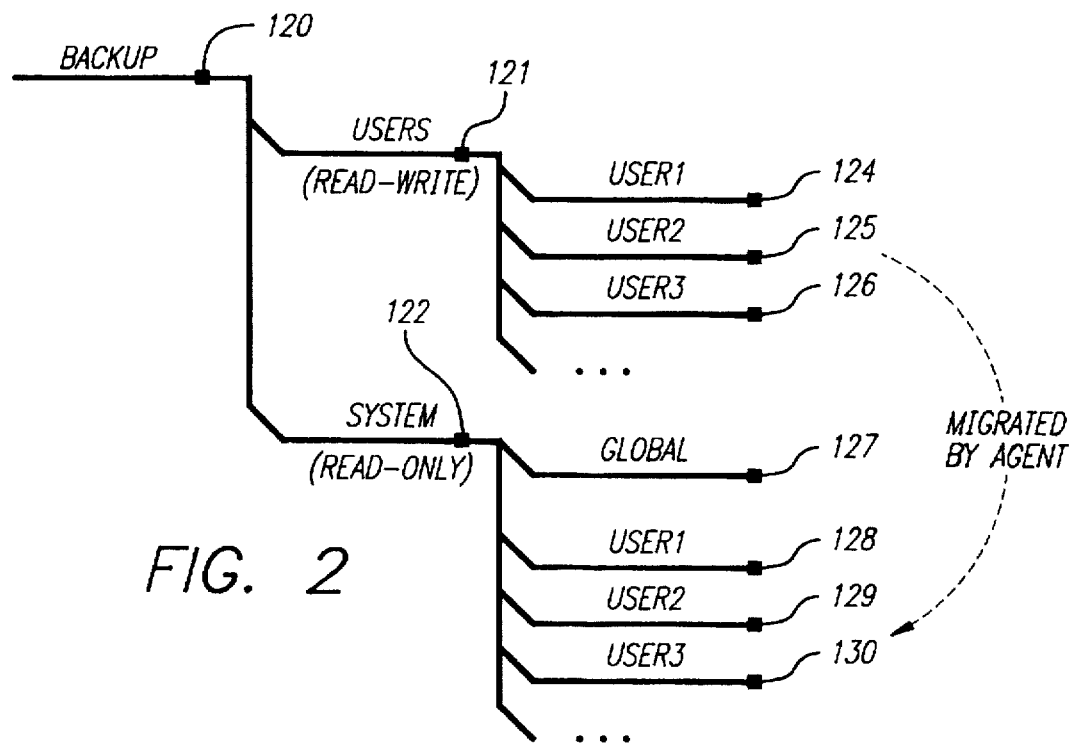
FIG. 2 is a diagram illustrating a typical directory structure where backup files are stored.

In the preferred embodiment, as shown in FIG. 1, the nodes to be backed up may be either workstations 102, desktop personal computers 103, laptop computers 104, or other servers 105 on the network. All communication is accomplished by creating or modifying files over the network 106 on the backup storage 101. As shown in FIG. 2, each node is assigned two directories, a user directory and a system directory, on the backup storage means 101, which is contained in the disk volumes of the network file server 100. The node has network write access to its user directory (e.g., \BACKUP\USERS\USER2, 125 in FIG. 2), where it posts backup data. A backup administrator configures the backup system using administrator software functions provided as part of the product. A backup Agent process 108, which runs on a network node 107 selected by the backup administrator, migrates the posted files to the system directory (e.g. \BACKUP\SYSTEM\USER2, 128 in FIG. 2). This system directory has network rights assigned to make it read-only to all nodes (except the Agent 108), so that no user node can corrupt the migrated backup data, intentionally or inadvertently. While it would not be strictly necessary to use two directories, data integrity is significantly improved in the shared-file environment of the preferred embodiment using this approach.

In the preferred embodiment, the Agent 108 has readwrite access to all the directories shown in FIG. 2. Each user is given read-only access to all the directories under \BACKUP\SYSTEM 122, but he has no access to any of the directories under \BACKUP\USERS 121, other than his own directory (e.g. \BACKUP\USERS\USER2, 125 in FIG. 2), to which he has read-write access. Limiting access to the posting directories in this fashion further increases security, since no user can inadvertently corrupt another user's posted backup files before they are migrated. However, since in the preferred embodiment all backup files are encrypted and have checksums that can be used to detect corruption, it would also be possible (and probably easier, from the viewpoint of the network administrator) in an alternate embodiment to give all users read-write access to all directories under \BACKUP\USERS 121 without significantly compromising security, assuming reasonably well-behaved users. The Agent 108 checks the integrity of each backup file while migrating it; if any errors are detected, the file(s) are not migrated, thus maintaining the integrity of the data on the \BACKUP\SYSTEM directories. Observe that this general approach of the preferred embodiment, using network access rights and an Agent 108, results in much higher levels of data security and integrity than in a conventional shared-file application, where each client node typically has full read-write access to the shared files, which are therefore much more susceptible to corruption.

Figure 3:
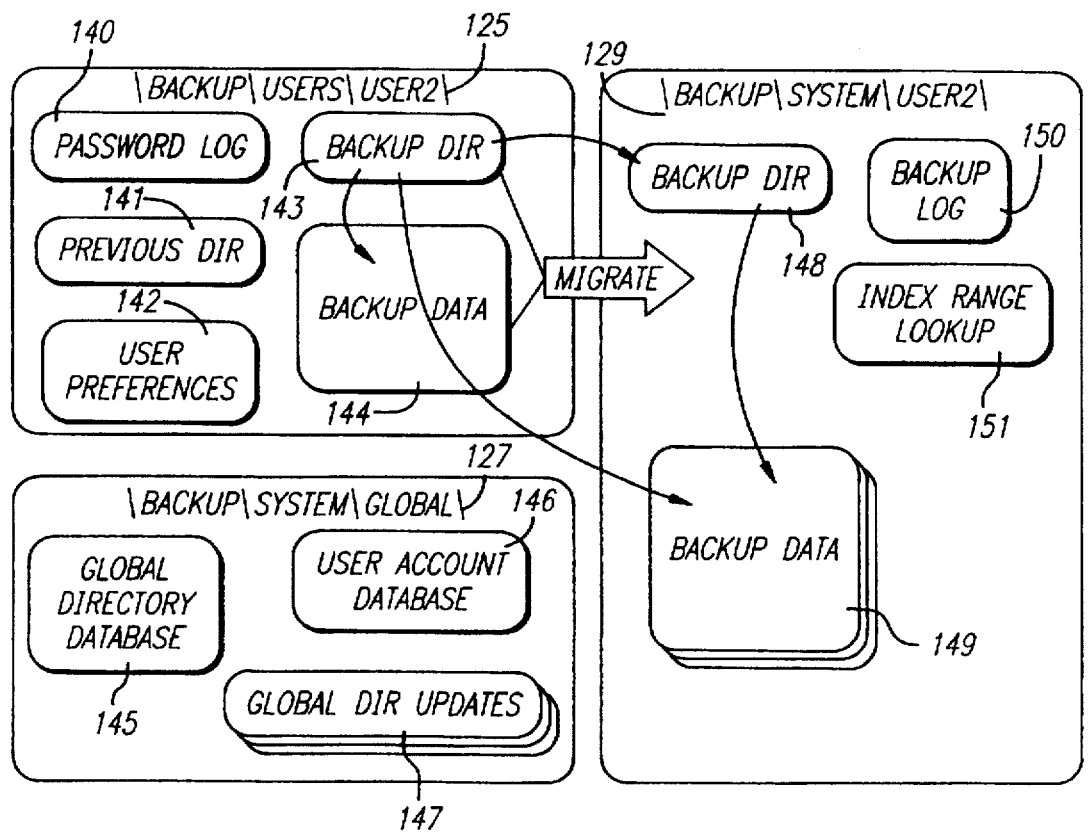
FIG. 3 is a block diagram illustrating the types of files contained in the backup directories of the present invention.

FIG. 3 shows the main types of files (as well as some of their inter-relationships) created as part of the backup system of the preferred embodiment. During the backup of a disk volume on a node, the backup process of the preferred embodiment separates all files on the source disk volume into four categories: new, unchanged, updated, and modified. New files are those which did not exist on the same directory at the time of the previous backup. Unchanged files existed at the time of the last backup and have not changed since that time (e.g., they still have the same time, date, and size). Updated files are files that had been unchanged for more than $N_u$ days as of the time of the previous backup, where $N_u$ is a user-selectable option (typically in the range of 14–90 days), but which have been changed since the last backup. All other files are classified as modified. When the first backup of a given volume is performed, all files are classified as new. For each new or updated file, the backup software searches through a global directory database 145 for a matching file. The global directory database 145 is created and maintained by the Agent process 108 in the directory \BACKUP\SYSTEM\GLOBAL 127. Each time the Agent 108 migrates a backup set from the \BACKUP\USERS path 121 to \BACKUP\SYSTEM path 122, it searches for new and updated files in the backup set and adds them to the global directory database 145. If a matching file is found in the database, a reference to the contents of that file is stored instead of the file data itself, as described below. Similarly, for unchanged files, only a reference to the previous file contents is stored.

In order to minimize search time and bandwidth, it is believed preferable not to conduct a search through the global directory database 145 for modified files. For the same reasons, and to minimize the growth of the database, modified files are not added to the global directory database 145. Instead, the contents of modified files are stored in the backup by computing the differences from the most recent version(s) of the file and saving either the differences or the new version in its entirety, whichever is smaller. Differences may be computed and represented in any manner known to those of ordinary skill in the art. The updated category, which can be thought of as a special user-defined subset of the modified category, serves to identify duplicate files across users which are updated on an infrequent basis. One common instance of such files would be the new version of the executables of a word processor or some other popular application. Note that setting $N_u$ to zero eliminates the modified category (i.e., all changed files are in the updated category), while setting $N_u$ to infinity eliminates the updated category (i.e., all changed files are in the modified category).

1.1. Backup Directory Files

The backup process of the preferred embodiment actually creates two files containing information about each backup set: a backup directory file (e.g., 143), and a backup data file (e.g., 144). In an alternate embodiment, these files could be combined into a single file. The contents of the backup directory file indicate the directory structure of the source disk volume, as well as pointers into the backup data files (e.g., 144, 149, and backup data files of other users) indicating where the data for each file is to be found. One key feature of the present invention is the data reduction achieved by duplicating pointers to data and directory information instead of duplicating the information itself, including referencing duplicate information across users. To explain the role of the backup directory file(s) in accomplishing this data reduction in the preferred embodiment, a description of key portions of the backup directory file (e.g., 143) for a DOS disk volume is given in FIG. 4 in Backus-Naur Form (BNF), which is a well known formal language technique (for example, see Nicklaus Wirth, *Algorithms+Data Structures=Programs*, 1976, pp. 281–291). Before discussing the contents of FIG. 4, we will explicitly define the conventions of our BNF, since there are slight variations in syntax from one author to the next. Non-terminals are enclosed in angle brackets (e.g., <fileEntry>) . The :==symbol indicates a formal definition. Terminals are indicated as single binary digits (0 or 1), or as hexadecimal quantities using C-like syntax: 0xUU for 8-bit bytes, 0xUUUU for 16-bit words, and 0xUUUUUU for 32-bit dwords. Ranges of terminal values are indicated as two terminal quantities with two periods in between; e.g., 0x00 ... 0xFE. The | character is a meta-symbol indicating "one or the other", while brackets [ ] indicate an optional field, and an asterisk (*) indicates one or more repetitions of the field. Thus, for example, [<externDirItem>]* indicates zero or more of the non-terminal <externDirItem>. The double slash // indicates a comment to the end of the line.

FIG. 4 defines the format of the directory information in a backup directory file (e.g., 143). At 200, the <volumeDirInfo> section of the file is defined to be a series of <subdirFileList> records 201, followed by a separate list of <externDirItem> records 220. Each <subdirFileList> record 201 contains the directory entries for the files and subdirectories in a single directory. In particular, as shown at 201, each <subdirFileList> record consists of a series of <fileEntry> and <subdirEntry> records 207, 208 (containing the directory entries for files and subdirectories, respectively, found in the associated directory) and is terminated by an <endOfList> marker 202 (for example, a zero byte). The <endOfList> marker 202 is followed by <externCount> 203, which is a variable-length encoded integer <itemCount> 204, representing the number of <externDirItem> records 220 associated with this directory. The particular encoding (204, 205, 206) of <itemCount> used in the preferred embodiment is not important; many simple alternate encodings would serve equally well, though it is usually desirable for the encoding to take advantage of the fact that small counts are much more common than large ones in order to minimize the average code size. In an alternate embodiment, the <externDirItem> records 220 associated with each <subdirFileList> 201 could be stored immediately after the <externCount> field 203 instead of in a separate section, as shown at 200; the preferred embodiment keeps these sections separate as a slight optimization, allowing the Agent 108 to scan through the entire <externDirItem> list 220 quickly to see which external items are referenced without the overhead of parsing the <subdirFileList> section 201.

In the preferred embodiment, the directory tree is represented implicitly by placing the <subdirFileList> records 201 in a conventional depth-first ordering. In other words, each time a subdirectory is encountered while "walking" the directory tree on disk, the <subdirEntry> record 208 for that subdirectory is appended to the current <subdirFileList> 201, and a token representing that subdirectory is pushed onto a temporary internal stack. When processing of the current subdirectory is completed, the <endOfList> and <externCount> fields 202, 203 are appended as shown at 201, and processing then continues in the subdirectory represented by the token which is popped off the internal stack. If the stack is empty, the entire directory tree is complete. In an alternate embodiment, another tree ordering (e.g., breadth-first) could be used to achieve similar results.

Each explicit <fileEntry> record 207 is assigned a directory item number (<dirItemNum> 223) that is unique across all backup sets for that user. In the preferred embodiment, this number is an incrementing 31-bit quantity as shown at 223 in FIG. 4; this size is sufficient since it allows, for example, for up to 10 backups per day, each with 10,000 changed files, for a period of over 50 years before overflow could occur. Of course, a larger quantity of bits could be used if necessary. The range of <dirItemNum> values 223 used is defined elsewhere in the backup directory file (e.g., 143); in order to save space, each <fileEntry> 207 in the <volumeDirInfo> record 200 is implicitly assigned the next <dirItemNum> 223 in the range, so that no explicit <dirItemNum> 223 needs to stored along with each <fileEntry> 207. During the backup process, when an unchanged file is found, instead of duplicating the <fileEntry> 207 for that file, a reference may be added to the previous <fileEntry> 207 by including its <dirItemNum> 223 in the <externDirItem> 220 list associated with the current directory. In the fairly common case where multiple unchanged files are found with consecutive <dirItemNum> values 223, in order to save space this sequence is indicated by a <manyItems> record 222, consisting, for example, of a one-bit tag (1), a 31-bit <dirItemNum> 223, and an <itemCount> record 204 which represents the number of consecutive external <fileEntry> records 207 referenced. Otherwise, the <externDirItem> 220 is represented as a <oneItem> 221, consisting of a one-bit tag (0) to distinguish this field 222 from a <manyItems> field, followed by the 31-bit <dirItemNum> 223 of the referenced <fileEntry> 207. Note that the <externCount> field 203 in the preferred embodiment counts the number of <externDirItem> 220 records, not the total number of <fileEntry> records 207 referenced thereby. The <fileEntry> and <subdirEntry> records are of variable length and consist of several fields, as shown at 207 and 208 in FIG. 4. These fields are dictated by the attributes of the underlying file system; for purposes of illustration, the definitions of FIG. 4 include attributes required for a DOS FAT file system, but obvious modifications can be made to the <fileEntry> definition 207 to allow for different attributes in different file systems (e.g., Macintosh, OS/2 HPFS, NetWare, etc.). The header of the backup directory file (e.g., 143) in the preferred embodiment contains a field specifying the source file system and thus indicates the particular format of the <fileEntry> records 207 in this backup. In the example of FIG. 4, the first field is the <fileName> record, defined at 212, which is a zero-terminated variable length character string (<asciiz>, as defined at 219), representing the name of the file. Next comes the <fileAttrib> field 209, which is a single byte containing attribute bits, such as read-only, directory, hidden, system, etc. The file modification time <fileTime> 210 follows; this 32-bit quantity includes both the time and date when the file was last modified. In more advanced file systems, several other time values could be added here, such as last access time, creation time, etc. The <fileSize> field 211 is a 32-bit quantity representing the size of the file in bytes. Finally, the <fileID> 214 field indicates where the file data associated with this file can be found. As shown at 214, this information includes a <userIndex> 216 and a <fileIndex> 215. Each user on the backup system has a unique user number <userIndex> 216, which is a 16-bit quantity in the preferred embodiment. Similarly, each file is assigned a unique number, similar to the <dirItemNum> 223 for directory items; this <fileIndex> 215 is a 32-bit quantity in the preferred embodiment. The two fields that make up the <fileID> 214 can be used to locate the appropriate backup data file (e.g., 148) containing the file data, as will be discussed below. The <subdirEntry> record 208 consists of the same first three fields as the <fileEntry> record 207, except that <fileTime> field 210 indicates the directory creation time. In an alternate embodiment, each <fileEntry> record 207 also contains a <lastVersion> field, which is a <dirItemNum> 223 that directly references the <fileEntry> 207 for the previous version of the file; this technique provides a linked list of all unique versions of the file, which could be reconstructed considerably more slowly by reading and parsing all backup directory files (including those where the file was unchanged).

In the preferred embodiment, there is no way to reference unchanged <subdirEntry> records 208 from previous backups. In other words, the entire tree of directories must be explicitly represented in each backup directory file (e.g., 143), although the files within those directories can be incorporated by references in the <externDirItem> section 220, as discussed above. This somewhat arbitrary decision in the preferred embodiment was made to simplify the backup and restore logic slightly at a small cost in the size of some backup directory files, but in an alternate embodiment it would be simple to allow referencing unchanged subdirectories (and entire file/subdirectory trees). The size of the backup directory file (e.g., 143) is normally a small fraction of the size of the backup data file (e.g., 144), and the contribution from the subdirectory entries alone to the size of the backup directory file is normally not significant, so this issue appears to be of very minor concern at most.

A somewhat related and possibly greater concern is the fact that, according to the definitions of FIG. 4, there is no limit on the number of external backup directory files (e.g., 148) referenced by a given backup directory file (e.g., 143). If this number were to grow without bound, when it came time to perform a restore, the amount of time required to reconstruct the directory tree could be quite large, even though all the backup directory files are on disk. In practice, in the preferred embodiment, there is a limit, imposed at backup time during the construction of the backup directory file (e.g., 143), on the number $N_D$ of external backup directory files (e.g., 148) which can be referenced. Typically this number is set in the range of $N_D$=5-20 files. The result is that the <fileEntry> record 207 for an unchanged file is explicitly re-included about every $N_D$ backups. This produces only a tiny increase in the overall storage requirements on the backup storage 101, but it guarantees a reasonable response time during the restore operation.

Note that, in the preferred embodiment, each user's backup files may only reference <externDirItem> records 220 from his own previous backups, not from other backups of other users. This decision, which results in a very minor cost in overall storage requirements, stems from the desire to maintain privacy of all user directory information. As we will see below, the contents of each backup directory file are encrypted so that no other user can even see the names, sizes, dates, or attributes of another's files, which might in themselves compromise privacy even without access to the actual file contents. By contrast, the data contents of files that are backed up can be shared between users, with privacy insured via a unique encryption key protocol discussed below. If the size of the backup directory files became a significant issue in an alternate embodiment (e.g., a new type of file system), techniques similar to those used for data could be applied to directory entries to save space if desired. For the file systems of interest to the preferred embodiment at this time, however, there appears to be no compelling need to minimize the size of the backup directory files any further.

To illustrate further the meaning of the BNF definitions in FIG. 4, FIG. 5 contains a small example of the format of a <volumeDirInfo> record 200. The format is that of 8086 assembly language, which allows for very flexible (if somewhat primitive) output of variable length fields. A semicolon (;) serves as a comment to end of line. The following directives are used to control output:

db=emit 8-bit byte(s)
dw=emit 16-bit word(s)
dd=emit 32-bit dword(s)

Hex constants end in 'H' (e.g., 80000000H) . Several fields in the example are left undefined using the (?) expression; for example, the file time/dates are unspecified because the particular times are not of interest for purposes of this illustration. In general, in order to clarify the usage, each line is followed by a comment containing the BNF non-terminal (s) corresponding to that line. The line-by-line comments refer directly to the BNF of FIG. 4, which has been described in detail above. Note that the <externDirItem> list, starting at 356, does not give any indication of the actual contents of the <fileEntry> records referenced; it is necessary to read and parse the contents of the separate referenced backup directory file(s) in order to obtain the directory entries.

In the preferred embodiment, each backup directory file (e.g., 143) contains several other sections. These sections are described briefly here. They generally involve well-understood techniques that are used in many other backup products, and are therefore readily understood by those of ordinary skill in the art. However, it is useful to give a brief explanation of the contents and purpose of these other sections to give a broader background context for the present inventions. Each section is covered by a checksum or CRC to allow for corruption checks, and many of the sections (including the <volumeDirInfo> section 200) are compressed using well known compression techniques, such as those described in U.S. Pat. No. 5,016,009, or U.S. patent application Ser. No. 07/927,343 (filed Aug. 10, 1992, entitled "DATA COMPRESSION APPARATUS AND METHOD USING MATCHING STRING SEARCHING AND HUFFMAN ENCODING"), both of which are assigned to the assignee of the present invention and both of which are incorporated herein by reference. In addition, each section (other than the header) is encrypted using a private key encryption scheme, such as the Data Encryption Standard (DES) or RSA's well known RC2 or RC4 algorithms; the key management protocol for this encryption is discussed in detail below. Finally, some primitive error correction ability is incorporated into each file by appending a section of overall parity sectors at the end of the file contents.

Each backup directory file in the preferred embodiment begins with a header which includes a signature and creation time stamp, as well information on file format version, file size, and pointers that identify the location and size of all other sections. A "bkupDescription" section contains descriptive information about the backup operation, including a user-generated annotation string, time of the backup, count of new files and bytes, ranges of new <dirItemNum> and <fileIndex> records 223, 215 generated, a backup file number, the <userIndex> 216, and a specification of the source volume for the backup. A "dirIndexRange" section is a small variable-length record which identifies the exact set of new <dirItemNum> values 223 included in the file, from which the <dirItemNum> 223 assignments are made in <volumeDirInfo> 200, as discussed previously; normally, there is only a single contiguous range of values, but it is possible after the Agent 108 has performed a consolidation operation (discussed below) for multiple non-contiguous ranges to exist in a single file. A "dirItemPtr" section contains an array of pointers into <volumeDirInfo> 200, one pointer for each <fileEntry> 207. This section is actually redundant and can be reconstructed by parsing <volumeDirInfo> 200; together with the "dirIndexRange" section, it serves to speed access to a <fileEntry> record 207 from a separate backup directory file via a <dirItemNum> reference 223. Finally, a "fileDecryptKey" section contains a private encryption key (e.g., for DES) that is used for decryption of the data file contents. There is one key in this section for each <fileEntry> 207 in <volumeDirInfo> 200; in fact, conceptually this key is part of the <fileEntry> record 207, but it is placed in a separate section in the preferred embodiment solely because including it directly in the <fileEntry> 207 would lower the compression ratio of the <volumeDirInfo> section 200.

There are many equivalent ways to organize the information in the backup directory file to achieve similar results. The particular record formats of preferred embodiment described here are not intended to limit the scope of the present invention.

1.2. Backup Data Files

The backup data file (e.g., 144) contains data from the files included in the backup set. Some of this data may be represented by references into other backup data files from previous backups (e.g., 149), either from this user or another user. Each unique file included in the backup data file is assigned a <fileIndex> 215, which is a 32-bit number in the preferred embodiment and which is used to reference that file. Observe that there is no one-to-one correspondence between <dirItemNum> 223 and <fileIndex> 215 values. For example, if user A has an exact copy of a file that has already been backed up by user B, user A's <fileEntry> 207 will contain the identical <fileID> 214 (i.e., <fileIndex> 215 and <userIndex> 216) as user B's, but they will have distinct <dirItemNum> values 223, which are not shared between users in the preferred embodiment, as discussed previously. Most of the data in a backup data file is compressed, the data from each file included in the backup set is encrypted using a file-specific key (stored in the "fileDecryptKey" section of a backup directory file, such as 143) instead of a private user key; in other words, multiple encryption keys are generally used in each backup data file. The key management protocol used to guarantee data privacy will be explained in detail below, but the net result is that, in the preferred embodiment, the contents of each backup data file are effectively publicly available, by contrast to the contents of the backup directory file, which are encrypted with a private, user-specific key.

Figure 6:
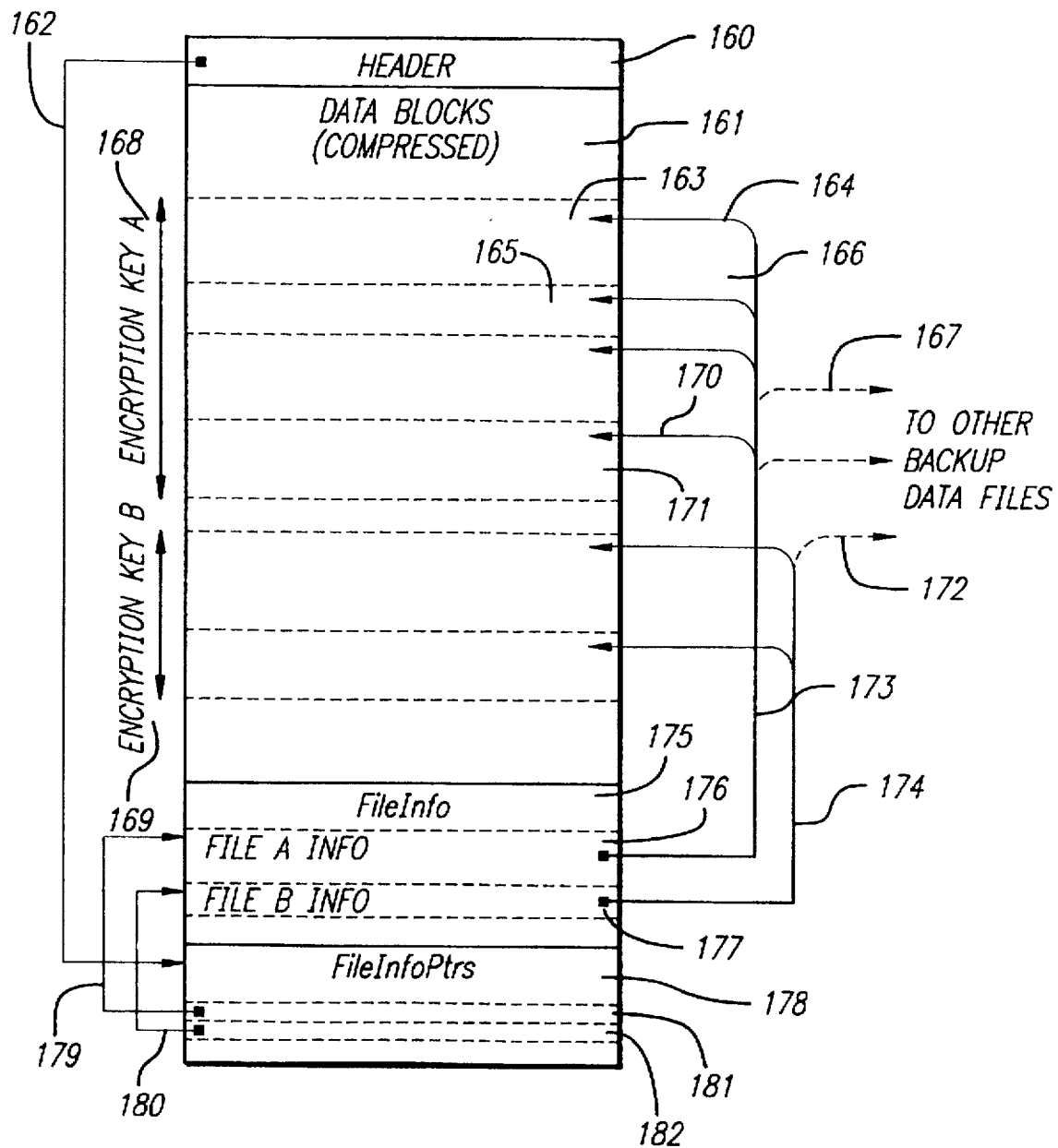
FIG. 6 is a block diagram of the layout of a backup data file in accordance with the present invention.

A high-level block diagram of the layout of a backup data file (e.g., 144) of the preferred embodiment is shown in FIG. 6. The file consists of four main sections, of which the Data Blocks section 161 is typically by far the largest since it contains the actual contents of the files included in the backup set. Because of its size, the Data Blocks section 161 comes directly after the fixed-size Header 160 in the preferred embodiment so that file data can be written directly into the backup data file without ever having to move the data blocks again. The Header section 160 contains a signature and creation time stamp, as well as information on file format version, file size, and a pointer 162 to the FileInfoPtrs section 178. Like the backup directory file, the backup data file may also contain parity sectors to allow simple error correction in the case where small disk flaws develop on sectors on the backup storage means 101. The FileInfoPtrs section 178 contains a variable size record indicating the exact set of <fileIndex> values 215 represented in the backup data file; this record is very analogous to the "dirIndexRange" section of the backup directory file discussed above, and typically consists of only a single contiguous range of values. The rest of the FileInfoPtrs section 178 contains an array of fixed size entries (e.g., 181), one entry per <fileIndex> value 215 represented in the range. Each entry contains a pointer (e.g., 179) into the FileInfo section 175, where there is one variable-sized entry (e.g., 176) per file. In addition, each entry (e.g., 181) in the FileInfoPtrs section contains other file-specific information (such as file size and a CRC over the initial blocks of the file contents) required to enter each new or updated file into the global directory database 145. Each FileInfo entry (e.g., 176) contains information on the contents of the file, including a variable length array of pointers (e.g., 173) into the DataBlock section 161 or into the contents of files contained in other backup data files.

For example, FIG. 6 illustrates some details of two files contained in the backup set. The FileInfoPtr entry 181 for File A includes a pointer 179 to the FileInfo entry 176 for File A. This entry 176 contains a set of pointers 173, including pointers 164 and 166 to data blocks 163 and 165, respectively, in the DataBlocks section 161, as well as pointer(s) including 167 to data blocks in other backup data files. All data blocks (including 163 and 165) in this backup data file associated with File A are encrypted using the encryption key for file A, as shown at 168; this key is stored in the "fileDecryptKey" section of the backup directory file(s) containing a <fileEntry> 207 whose <fileID> 214 references File A. Similarly, the FileInfoPtr entry 182 for File B includes a pointer 180 to the FileInfo entry 177 for File B. This entry 177 contains a set of pointers 174, including pointer 170 to data block 171 in the DataBlock section 161, as well as pointer(s) including 172 to data blocks in other backup data files. All data blocks (including 171) in this backup data file associated with File B are encrypted using the encryption key for file B, as shown at 169.

Given a <fileID> 214 and the decryption key, it is relatively straightforward to extract the file contents to "restore" a file. First, a search is performed through the backup data files of the user identified by <userIndex> 216 for the backup data file containing the <fileIndex> 215 of interest. This search can be easily performed, because the Header 160 and FileInfoPtrs 178, which contains the range of <fileIndex> values 215, are not encrypted. In the preferred embodiment, the search can normally be performed even more quickly because the Agent 108, as part of the migration process of backup data files from \BACKUP\USERS 121 to \BACKUP\SYSTEM 122, builds a special Index Range Lookup file (e.g., 151 of FIG. 3). This file, which is redundant in the sense that it can always be re-built from the contents of the backup data and directory files, includes a table which maps index ranges into backup data file names and which is arranged for a fast binary search. With the appropriate backup data file identified, this file is opened, and the pointer 162 to the FileInfoPtrs sections is read from the Header 160. The index range record of the FileInfoPtrs section 161 is then scanned to identify which pointer corresponds to the given <fileIndex> 215; that pointer (e.g., 179) is then used to index the FileInfo entry (e.g., 176) for the file of interest. From the FileInfo entry, pointers (e.g., 173) are found to the data blocks corresponding to each portion of the file of interest, which may reside either in this backup data file (e.g., 163) or an "external" backup data file (e.g., 149). These blocks are then read, decrypted, and decompressed to provide the original file contents. It can be seen fairly easily that accessing any portion of the file contents requires only a handful of disk accesses. Although the number of accesses is probably larger than would be necessary to access a file on a "normal" file system, it is still small enough that the access time during restore is measured in milliseconds (or tenths of seconds at worst), not the tens of seconds or the minutes normally associated with restore operations from conventional tape backups. Clearly, in order to optimize restore "access" time, the restore software may include an intelligent caching algorithm for the contents of the backup directory and backup data files.

Given this high-level understanding of the various sections of a backup data file, consider FIG. 7, which contains a set of BNF definitions giving considerably more detail on the format of some of these sections. At 400, the entire file <bkupDataFile> is defined to consist of the four main sections discussed above (<header> section 401, <dataBlock> section 405, <fileInfo> section 408, and <fInfoPtrs> section 432); the remainder of FIG. 7 describes the contents of these sections.

The relevant portions of the <header> section are listed at 401. In particular, the <fInfoPtrOffset> field is defined at 402 as a pointer (32-bits in the preferred embodiment) to the start of the <fInfoPtrs> section 432. The <indexRangeCnt> field is defined at 403 as a count of the number of <indexRange> entries 433 in the <fInfoPtrs> section 432.

At 405 and 406, each <dataBlock> is defined to be a variable-length array of 8-bit bytes. In the preferred embodiment, each <dataBlock> 405 starts at an offset in the backup data file (e.g., 144) which is a multiple of 4, so that the offset can be encoded in 30-bits. This convention allows slightly tighter packing of the <seekPoint> fields 416 at a very minor cost in the overall size of the backup data file, but this optimization is in no way critical to the invention. Each dataBlock may be compressed (indicated by <packFlag> 422 of the associated <dataBlockPtr> 419) and then encrypted. The encryption key for each <dataBlock> 405 is not kept in the backup data file (e.g., 144); as discussed previously, the keys reside in encrypted form in the backup directory file(s) which reference the associated file data blocks. Typically the <dataBlock> section 405 is by far the largest section in the backup data file. As part of the encryption process, a checksum is appended to each <dataBlock> 405 in order to facilitate a quick check for corruption, either of the block itself or of the pointer to it.

Definition of the <fInfoPtrs> section begins at 432. In particular, this section consists of two variable-length arrays of <indexRange> 433 and <fileInfoData> records 436. As discussed previously, the number of <indexRange> records 433 is indicated by the <indexRangeCnt> field 403 of the <header> 401. Given the <indexRangeCnt> value 403 and the size of each <indexRange> record 433 (8 bytes in the preferred embodiment), the location of the first <fileInfoData> record 436 is easily deduced. Normally a backup data file has only one <indexRange> 433 (i.e., a single contiguous range of file indices), but it is possible after the Agent 108 has performed a consolidation operation (discussed below) for multiple non-contiguous ranges to exist in a single file. Each <indexRange> record 433 consists of two fields: an <indexBase> 434 and an <indexCount> 435, each of which are 32-bit values in the preferred embodiment. The <indexBase> value 434 indicates the first file index in the range. The <indexCount> value 435 indicates the number of file indices in the range. The sum of the <indexCount> values 435 from all <indexRange> records 433 indicates the number of <fileInfoData> records 436 in the file. In the preferred embodiment, the file index associated with each <fileInfoData> record 436 is implicitly assigned sequentially from the ordered set of file index values generated by the <indexRange> record(s) 433.

In the preferred embodiment, each <fileInfoData> record 436 is of fixed-size, consisting of four 32-bit fields, as shown at 436–440. In particular, the <fileInfoPtr> value 437 points to the associated variable-length <fileInfo> record 408. The <fileSize> value 438 indicates the size of the associated file in bytes. The <dirInfoCRC> value 439 is a hash value (a CRC in the preferred embodiment) computed over a portion of the directory entry for the associated file; use of this fixed-size value instead of a variablelength directory entry simplifies the search for matching files between users. The <partialFileCRC> 440 is a hash value (a CRC in the preferred embodiment) computed over the first portion of the file. In the preferred embodiment, it covers up to the first $N_P$=256K bytes of the file (which is all of the file in most cases). When searching for matching files across users, the backup application loads $N_P$ bytes of the file into memory and computes a hash value (<partialFileCRC> 440), then performs a preliminary search through the global database (e.g., 145) for matching <fileInfo> records 408. If a match is found, then a more complete match can be verified using the full <fileCRC> field 409, although there is usually no need to perform this further check since most files are smaller than $N_P$ bytes. Using this partial-file hash technique generally allows a single-pass search for files that are too large to fit into memory, instead of having the read the entire file once to compute the <fileCRC> 409 and then a second time to back up the file contents if there is no match.

There is one variable-sized <fileInfo> record 408 for each file included in the backup data file. The <fileCRC> value 409 is a hash over the entire contents of the file; in the preferred embodiment, a CRC is used. The <bitFields> record 410 contains several small bit fields indicating various attributes of the <fileInfo> record. For example, the <refCnt> field 411 is a two-bit field in the preferred embodiment, indicating how many external files are "referenced" in reconstructing the contents of the file, and can take on the values 0 (no external files), 1 (one external file), or 2, while the value 3 is not allowed in the preferred embodiment. This particular limitation is imposed only to optimize the encoding of the <dataPtr> field 419; in theory, there is no reason why more external files could not be referenced, although in practice it is very rare for more than one external file to be referenced: the previous file version. The value of the <refCnt> field 411 indicates the number of <fileRef> records 426 that are included in the <fileInfo> record 408. The <refLevel> field 412 is a six-bit field in the preferred embodiment and is defined to be the one plus the maximum <refLevel> value 412 for any external referenced file indicated in a <fileRef> record 426, or zero if <refCnt> 411 is zero. Thus, the <refLevel> value 412 counts the maximum levels of "indirection" required to access any portion of the file contents; this value is limited in the preferred embodiment to a user-settable parameter $N_L$ (typically in the range 5–10) in order to set an acceptable bound on access time to the contents of the file at restore time. Whenever the <refLevel> value 412 would exceed the $N_L$ value if a particular external file were referenced, the data from the associated block is duplicated instead of being incorporated by reference. The <isGlobal> bit 413 indicates whether the given file should be entered into the global directory database 145; it is 1 for new and updated files and 0 for all other files.

The <seekPts> record 414 contains a count <seekPtCount> 415 (32-bits in the preferred embodiment) of the number of <seekPoint> records 416 in the <seekPts> record. Each <seekPoint> record 416 consists of the starting <logicalOffset> value 417 associated with the <seekPoint> 416, followed by a pointer <dataPtr> 418 to the associated data. The <seekPoint> array 416 is saved in sorted order based on the <logicalOffset> values 417, allowing a quick binary search to find the <seekPoint> 416 for any particular logical offset in the file. The number of bytes of the file "covered" by each <seekPoint> 416 is easily calculated by subtracting its <logicalOffset> value 417 from the <logicalOffset> value 417 of the succeeding <seekPoint> 416 (or from the <fileSize> field 438 for the last <seekPoint> record 416). There is no firm limit in the preferred embodiment for the minimum number of bytes covered by a <seekPoint> 416, but typically the blocks are fairly large (8K bytes or more), although this may decrease (or increase) as portions of external files are referenced.

The <dataPtr> field 418 can take one of two forms: either a <dataBlockPtr> 419 reference to a <dataBlock> 405 in this backup data file, or a <externPtr> 420 to an external file. In the preferred embodiment, these two fields each consist of 32 bits and are distinguished by the value of a single type bit in the <dword>, as shown in 419 and 420. If the <dataPtr> field 418 is a <dataBlockptr> 419 (as determined by the type bit being 0 as shown at 419), the <packFlag> bit indicates whether or not the associated <dataBlock> 405 is compressed, and the <blockOffs> field 421, which comprises the remaining 30 bits of the <dataPtr> 418 in the preferred embodiment, points to a <dataBlock> 405 in this backup data file. As discussed previously, each <dataBlock> 405 starts on a 4-byte boundary in the preferred embodiment, so that the 30 bits is sufficient to represent any <dataBlock> offset in the file. If the <dataPtr> field 418 is a <externPtr> (as determined by the type bit being 1 as shown at 420), the <refFileNo> bit 424 indicates which file is being referenced (hence only two files can be referenced in the preferred embodiment), and the <refOffs> value 423 is a signed relative logical offset from the <logicalOffset> 417 of this <seekPoint> 416, indicating the absolute logical offset in the external referenced file where the data associated with this <seekPoint> 416 can be found. Notice that accessing such an external block given this logical offset requires parsing the <fileInfo> section 408 and <seekPoint> records 416 of the referenced file in another backup data file, which may in turn reference yet another external file; hence the limitation $N_L$ on the number of reference levels. In the preferred embodiment, the <refOffs> field 430 is only 30 bits, so a referenced external block must start within +/-512 Mbytes of the given <logicalOffset> 417, which is not a limitation in practical terms, although this restriction could easily be removed by extending the size of the <dataPtr> field 418 when dealing with extremely large files.

The optional <fileRef> records 426 indicate which external file(s) are referenced by the <externPtr> fields 420 of the <seekPoint> array 416. These <fileRef> records 426 are encrypted with the same encryption key used for the <dataBlock> records 405 for this file. The <fileID> record of the <fileRef> 426 is identical in format to the <fileID> record 214 used in the backup directory file, containing the <fileIndex> 215 and <userIndex> 216 fields that identify the particular file being referenced. The <decryptKey> record 427, which consists of 64-bits in the preferred embodiment, contains the private encryption key used for the referenced file. This key is also contained in the backup directory file(s) which contain <fileID> records indicating this referenced file, but the key is duplicated here because it may only be otherwise available from a backup directory file of another user, which is encrypted with that user's personal encryption key. Hence, although the key is included here, it is encrypted to restrict access to only those users who have legitimate access this file, as discussed below, so as not to compromise the privacy of the referenced file.

Figure 8:
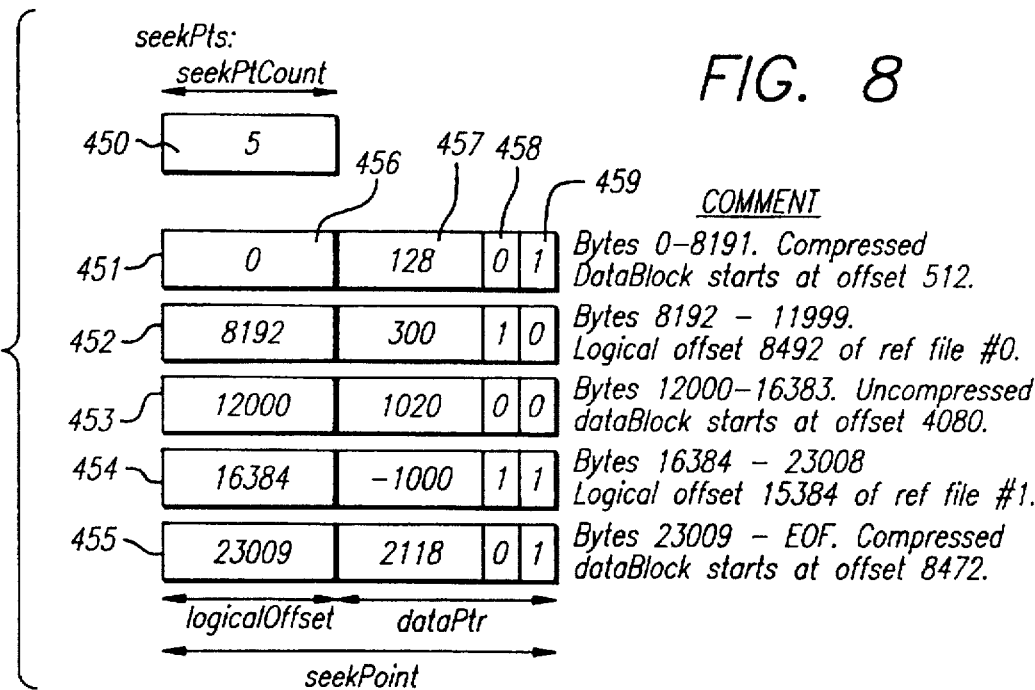
FIG. 8 is a block diagram illustrating an example of a <seekPts> record in a backup data file, in accordance with the present invention.

FIG. 8 gives a detailed example of the <seekPts> record 414 for a hypothetical file X. The <seekPtCount> of this record is 5, as shown at 450. Thus, there are five <seekPoint> records, 451–455, each of which is broken up into its <logicalOffset> field (e.g., 456) and its <dataPtr> field (e.g., 457, 458, 459). The first <seekPoint> record 451 has a starting logical offset of 0 as shown at 456, and this <seekPoint> record covers the first 8192 bytes (0-8191) of file X, since the second <seekPoint> 452 starts with logical offset 8192. These 8192 bytes associated with the first <seekPoint> record 451 are found in a <dataBlock> within this backup data file, as is indicated by the type bit 0 at 458 which identifies the <dataPtr> record of 451 as a <dataBlockPtr>. The <blockOffs> field 457 of the first <seekPoint> record 451 contains the value 128, indicating that the associated <dataBlock> is to be found at offset 512 (i.e., 4*128) in this backup data file, and the 1 bit in the <packFlag> field 459 indicates that this <dataBlock> is compressed. Similarly, the second <seekPoint> record 452 covers the bytes 8192-11999 of file X, but these 3808 bytes are to be found starting at logical offset 8492 of the external file indicated by the first <fileRef> record (ref file #0) in this <fileInfo> record. The offset 8492 is computed by adding the <-logicalOffset> value of the second <seekPoint> record 452 (i.e., 8192) to the <refOffs> value of the <dataPtr> record of the second <seekPoint> record 452, which is an <externPtr> as indicated by the 1 type bit in the <dataPtr>; the <refFileNo> field of 452 indicates which <refFile> is referenced (0 in this case) . The third <seekPoint> record 453 covers bytes 12000-16383 of file X and indicates an uncompressed data block starting at offset 4080 of this backup data file. The fourth <seekPoint> record 454 covers bytes 16384-23008 of file X, and these 6625 bytes are to be found in reference file #1 at logical offset 15384 (<logicalOffset>+<refOffs>=16384-1000=15384); note that <refOffs> is a negative number in this case. The fifth (and last) <seekPoint> record 455 covers all the remaining bytes of file X; for example, if the <fileSize> is 30000, this block consists of the 6991 bytes 23009-29999. These bytes are found in a compressed <dataBlock> at offset 8472 of this backup file. This example shows how simple it is to interpret the <seekPts> structure, and it is obvious that a binary search on the <logicalOffset> field can be used to locate any section(s) of the file very quickly.

The <fprints> section 428 of the <fileInfo> record 408 contains hash functions or "fingerprints" computed over fixed-size portions ("chunks") of the file contents. The purpose of these fingerprints is to allow efficient probabilistic searching of matching chunks between file versions without having to fully extract the contents of the previous file version. The idea of using fingerprint functions in this fashion was first conceived by Karp & Rabin [Karp, Richard M., and Michael O. Rabin, "Efficient Randomized Pattern-Matching Algorithms", Harvard University Center for Research in Computing Technology, TR-31-81, December 1981]. Fingerprints are particularly effective when performing backup of modified files over a low-speed communications link when the backup data files are at the remote site, as discussed in a subsequent section. In the preferred embodiment, although there is no absolute need to use the fingerprints (since the previous file contents can be explicitly produced for chunk matching), the fingerprints are stored in the backup data file anyway to facilitate such bandwidth optimizations; in particular, even over local area networks it may be desirable to minimize network traffic when backing up large files with only small modifications. The size of the chunk used for fingerprinting, which may vary from file to file, is indicated by <fpChunkSize> 429 and is typically in the range of 256 to 8192 bytes; a value of 0 for <fpChunkSize> 429 indicates that no fingerprints are stored. Like the <decryptKey> record(s) 427, in the preferred embodiment, the <fprints> record 428 is encrypted using the associated encryption key from the "fileDecryptKey" section of the backup directory file.

The basic idea behind fingerprinting, as described in detail by Karp & Rabin, is to choose a hash function which is easy to "slide" over a chunk of data. In other words, as the chunk starting location is moved from one position in the file to the next, the "oldest" byte exits the chunk "window", the intermediate bytes shift over one location, and a new one enters the window. Karp & Rabin describe several types of linear fingerprint functions which are easy to update given the current fingerprint value and the oldest and newest bytes. For example, a modulo 256 sum is a particularly simple case (too simple to be useful in practice), but CRCs and other similar functions are quite acceptable. Given the set of fingerprints for the chunks of the previous file contents, the fingerprint function is computed by sliding over chunks of the current file contents, checking for a match with any of the previous file fingerprint values at each byte location. When a match is found, that chunk in the current file is assumed to match the chunk associated with the fingerprint value in the previous file. The fingerprint function can be chosen to be large enough (72 bits in the preferred embodiment) that the probability of false match (e.g., $2^{-72}$, or approximately $10^{-22}$) is smaller than the probability of storage medium failure (typically $10^{-15}$) so that no further validation is necessary. Alternately, this sliding fingerprint mechanism can be used solely as a search technique to identify areas of probable matches and then fully validate them by extracting the old file contents and performing a complete compare. It is also possible to use fingerprints only in a non-sliding fashion; this approach works particularly well for very large (e.g., database) files where records tend not to move, while for smaller files, where the bandwidth consumption is not as much of an issue, a full compare could be performed in this case. In an alternate embodiment, a global database could be built of chunk fingerprints instead of entire files, allowing matching of portions of files across users, but the expected gain in storage space from such a scheme does not appear to be worth the extra overhead required.

In the preferred embodiment, each <fingerprint> record 430 consists of nine bytes (72 bits) of fingerprint function (CRCs), plus the first three bytes of the associated chunk, for a total of twelve bytes. Using these extra three bytes allows the fingerprints to be computed and compared on a sliding dword-by-dword basis instead of a byte-by-byte basis, which speeds up the computation considerably. However, other than speed, the net result is the same as a byte-by-byte sliding fingerprint comparison. There is one <fingerprint> record 430 per chunk of the file; however, in order to save disk space, no <fingerprint> records 430 are included for chunks which are entirely contained in external file references (via <externPtr> records 420) with identical <fpChunkSize> values 429 and which are on chunk boundaries in the referenced file, since the fingerprints for those chunks are already contained in the <fileInfo> 408 for the referenced file.

There are many possible variations on the particular layout of records in the backup data file of the preferred embodiment. For example, in an alternate embodiment, each <fileInfo> record 408 could be placed directly after the set of <dataBlock> records 405 associated with the file instead of in a separate section; for example, this change might be represented by simply changing definition 400 to read:

<bkupDataFile>:==<header>[<dataBlock>* <fileInfo>]* <fInfoPtrs>

Similarly, some fields, such as <fileCRC> 409 and <isGlobal> 413, could be moved from <fileInfo> 408 to <fileInfoPtrs> 432, or vice-versa. In some file systems (e.g., Windows NT NTFS), 64-bit file pointers would be used instead of the 32-bit pointers of the preferred embodiment. It would also be simple to modify the format slightly to allow for more reference files or more reference levels. Such changes do not affect the basic idea, and the particular record formats of preferred embodiment described here are not intended to limit the scope of the present invention.

1.3 Global Directory Database File

With a knowledge of the information contained in the backup data and directory files and of how the information is used to represent file data contents, the technique for searching for matching files can easily be explained. In designing the global database, it was assumed that there could be millions (or tens of millions) of new/updated files entered into the database. For example, a survey of ninety user workstations at Stac (the assignee of the present invention) revealed a total of about 250,000 unique files across all the disks, and the preferred embodiment is designed to handle systems with at least that many backup nodes. Thus, it is important to minimize the network bandwidth consumed by the search process, which might easily dwarf the file data traffic during backup unless great care is taken in the database design. In particular, several conventional database approaches (e.g., B-Tree) were considered and rejected in light of this concern. While there may be other types of database architectures that work well, the structure of the database of the preferred embodiment is particularly efficient for the type of searches required here.

During the backup process, each node may have thousands of new/updated files that need to be searched against the global database. Generally, there will be considerably fewer such files once the initial backup is completed, but the worst case must be handled. By contrast, there may be millions of files already entered into the database. Thus, it seems initially that a client/server embodiment with a backup server, in which the client sends its (relatively small) list of new/updated files to the server, which in turn does the matching against the large global database, should have a significant advantage in network bandwidth usage over a shared-file system. However, the overhead of performing the search in the shared-file environment of the preferred embodiment is optimized to the point that this drawback is not significant in practice.

When searching for matching files across users, it is usually deemed sufficient to have matching file size, file name, time/date, and hash value (e.g., CRC) computed over the file contents. While this approach does involve a finite (though minute) probability of false match, the error probability is acceptably small for almost all practical applications. In an optional user-invoked "exhaustive compare" mode, this probabilistic type of match serves only to initiate a complete byte-by-byte comparison of the contents of the two files; however, the overhead of this mode is large enough, particularly in light of the practically negligible improvement in the level of certainty obtained thereby, that invoking such "skeptical" behavior is best done infrequently, if at all. In alternate embodiments, the match criteria can be further loosened not to require a matching file name or time/date; for example, two files 'REPORT.DOC' and 'REPORT.BAK' might be judged to be matches if all other parameters are equal. There are many variations on this theme; for instance, perhaps just the file names, excluding extensions, are compared, or perhaps only the first few (e.g., 4–6) characters of the file name are compared in an attempt to include minor file renaming changes, such as 'REPORT' to 'REPORT1'. In general, however, the file size (or at least some number of least significant bits of the size) and the hash value on the file contents are required to be equal in order for a file already in the database to be judged identical to a new/updated file being backed up. In the preferred embodiment, in order to work around the "problem" of the variable length of the file name (or of other directory attributes) in formatting the global database entries, a 32-bit hash (actually, a CRC, <dirInfoCRC> 439) over the relevant directory entry information (e.g., file name, time, date, and size) is used for comparison instead of the full directory entry. In addition, the complete hash value (a 32-bit CRC in the preferred embodiment) over the file contents is compared, as well as the least significant 16-bits of the file size. If all of these values match, the file being backed up is considered to be a match to the file in the database, resulting in an false match probability of less than $2^{-8}$ ($10^{-24}$). Clearly, the amount of matching required can be tailored to the specific error probability acceptable for any given environment (e.g., by increasing the size of the CRCs), and such changes would still fall within the scope of the present invention.

It is useful to note at this point that these various levels of matching files across users in the global database are all more rigorous in general than the level of effort used to identify unchanged files from the previous backup of the same user. In the preferred embodiment, as is quite common in backup applications, the default behavior is to consider a file unchanged if its file size, time, date, and name are unmodified from the previous backup. As discussed above, it is always possible to perform, at the user's option, either an exhaustive comparison of the contents of the apparently unchanged files or a comparison of CRCs on file contents, but the improvement in certainty level is rarely considered to be worth the extra effort and overhead.

Given the <dirInfoCRC> 439, <fileSize> 438, and <fileCRC> 409 values for a particular file to be backed up, a search through the global database of the preferred embodiment is performed in an attempt to find a matching entry. As noted previously, the <partialFileCRC> 440 value is actually used initially instead of the full <fileCRC> 409 as an optimization, since the former covers the entire file in most cases; for large files the <fileCRC> 409 is then verified in the preferred embodiment by looking into the backup data file containing the <fileInfo> 408 for that file. Each global database entry contains the <dirInfoCRC> 439 (four bytes), <fileSize> 438 (actually only the least significant sixteen bits in the preferred embodiment), and <partialFileCRC> 440 (four bytes) values for the associated file, which are extracted from the backup data file containing the <fileInfoData> record 436 for that file. In addition, each entry contains the <fileID> record 214 (six bytes) which can be used to locate the actual file data contents. The total size for an uncompressed database entry is thus fixed at 16 bytes in the preferred embodiment. If there are N=one million files in the database, downloading an entire global database from the backup storage means 101 in order to perform the search would require a download of 16 MB of data, if no effort were made to minimize this overhead. While this amount is considerably less than what would be required to download a database full of complete directory entries (e.g., with entire file names), it is still far too large for an environment where dozens or hundreds of nodes on the network may be performing backup. In an alternate embodiment, the complete <fileSize>, <fileCRC>, and other fields could also be stored in each global database entry, slightly reducing both the probability of false match and the search time, at a small cost in the size of the global database file 145, but such improvements are minor at best in practical terms.

Figure 9:
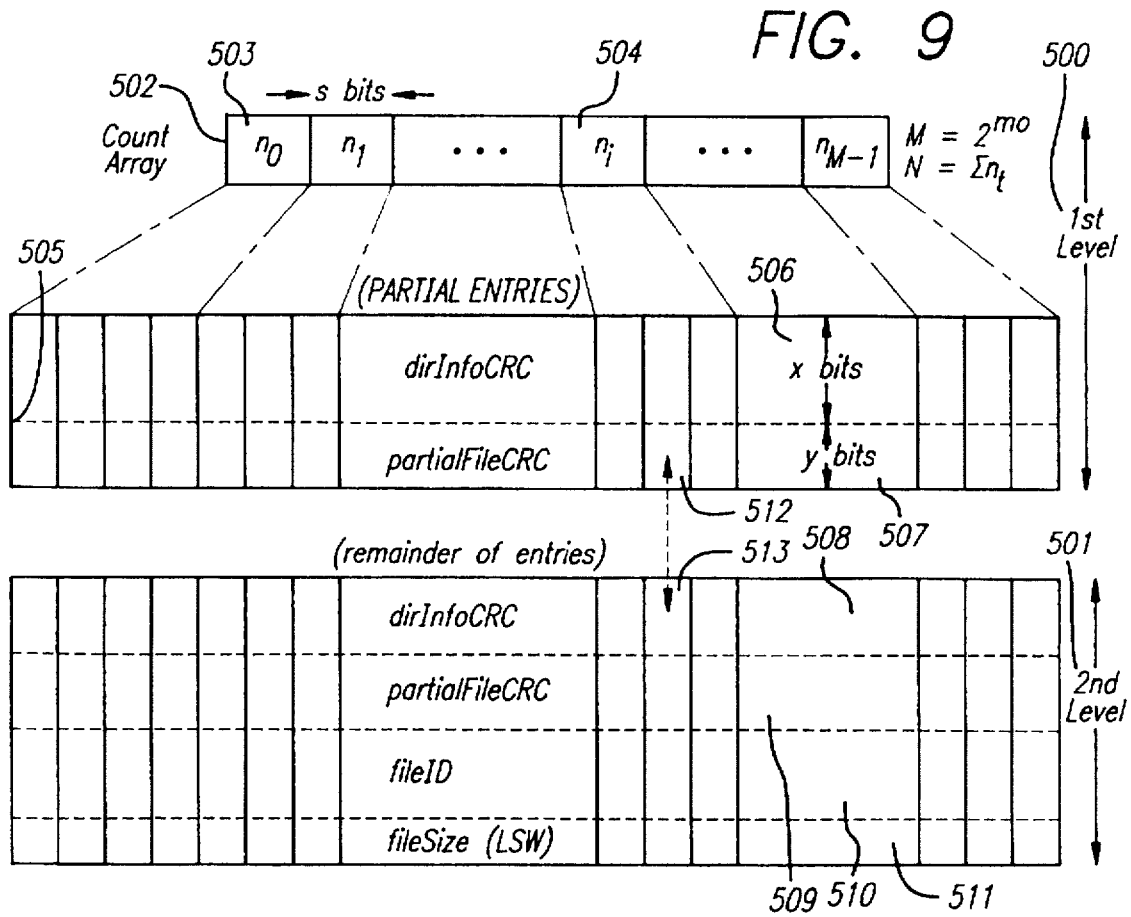
FIG. 9 is a diagram illustrating the layout of a global directory database file in accordance with the present invention.

To minimize the data transfer overhead and the search time associated with the global directory database 145, it is organized into two levels as shown in FIG. 9, taking advantage of the effective randomization of search values due to the nature of a CRC function, as used in <dirInfoCRC> 439 and <partialFileCRC> 440. Each entry of the first level 500, which is actually represented in two structures 502 and 505, contains only a subset of the bits of the <dirInfoCRC> 439 and <partialFileCRC> 440 fields. Each entry in the second level 501 contains the remaining bits needed to constitute the entire global database entry (e.g., 508, 509, 510, and 511), and each entry also includes a 16-bit CRC over the second-level entry to allow for a corruption check. The number of bits included in the first level 500 is fixed in each global database file, although the actual number will increase in general as the number of database entries grows. The first level 500 is downloaded to the node from the backup storage means 101 by the backup program, and its contents (502 and 505) are used as a quick filter to limit inquiries into the (much larger) second level 501 to only those entries which have a very high probability of being a match. In the preferred embodiment, to minimize download time, all entries in the first level 500 are packed at a bit level and are unpacked after downloading, while entries in the second level are bytealigned for simplicity.

The entries in both levels are stored in the same order, sorted by the value of <dirInfoCRC> 439, so that given the index of an entry (e.g., 512) in the first level 500, the position of the corresponding entry (e.g., 513) in the second level 501 can be easily computed. In other words, the kth entry in the first level 500 corresponds directly to the kth entry in the second level 501. The first level entries are actually stored in a compressed form to save download time, using a counts array 502 and partial entry array 505. This simple compression is achieved by noting that, since the entries are sorted by the value of <dirInfoCRC> 439, the leading (most significant) bits of consecutive <dirInfoCRC> values 439 will tend to be equal. Thus, instead of storing these leading bits for each entry, a counts array table 502 of $M=2^{m_o}$ entries is included, where the value of $m_0$ is selected by the Agent 108 as discussed below. The jth array entry, $n_j$, containing the number of consecutive <dirInfoCRC> entries 439 with the leading $m_0$bits having a value of j, as shown at 504. For example, in FIG. 9, $n_0$ is 4, covering the first four entries in the tables 505 and 501, for which the leading $m_0$ bits of <dirInfoCRC> 439 are 0; similarly, $n_1$ is 3, covering the next three database entries, for which the leading $m_0$ bits of <dirInfoCRC> 439, interpreted as an integer, are 1. When the database is created, the Agent 108 chooses the value of $m^0$ based on the total number of global directory entries (N) in the file; a typical value is $m^0$=16 for N larger than 64K. Note that $N=\Sigma n_j$, where the sum is over all values of j=0, ..., M−1. Since the values of <dirInfoCRC> 439 in the file are effectively randomly distributed, the $n_j$ values have a distribution with mean N/M and a fairly small range. Thus, to minimize storage space further in the preferred embodiment, instead of storing the actual values $n^j$, these values are represented in the counts array 502 by $n^j-n^{min}$, where $n_{min}$ is the minimum over all $n_j$ values. Each count can then be represented in $s=\lceil log_2(1+n_{max}-n_{min}) \rceil$ bits, where $n_{max}$ is the maximum over all $n_j$ values. The values $n_{min}$ and s are computed by the Agent 108 when the global database file is created and are stored in the header of the global database file. In an alternate embodiment, it may be possible to reduce the size of the counts array 502 even further using a Huffman or arithmetic code, but such gains would be minor because the counts array 502 constitutes only a small part of the size of the first level 500.

A concrete example is the easiest way to clarify this simple encoding. Suppose that we have a total of N=one million database entries. If we choose $m_o=16$, then M=64K, and the average value in the counters array 502 is N/M ~16. Suppose that we then find $n_{min}=2$ and $n_{max}=30$. Then s=5 bits, so each count entry $n_j$ is represented in five (packed) bits by the value $n_j-2$, for a total of 40K bytes (64K entries at 5 bits each). Without using a count array, each database entry in 502 would have contained all $m_0=16$ leading bits of the <dirInfoCRC> value 439, for a total of nearly two megabytes (1953K bytes), so using the count array in this case saves a total of nearly 1913K bytes in the size of the first level 500. Note that the amount of savings is not very dependent on the value of s; using simulations on a random distribution, it has been observed that even for N/M as large as 1024, which corresponds to 64 million files in the database if $m_0=16$, well over 99.9% of all count array distributions can be represented by s =8 bits or less. In practice, the Agent 108 tries various values of $m_0$ to minimize the size of the first level 500, although it appears empirically that the amount of savings is not terribly sensitive to the choice of $m_0$ as long as it is close to the $m_0$ value that produces the minimum; in other words, simply using $m_0=16$ appears to work fairly well in most cases of interest.

With the counts array 502 used to represent the first $m_0$ bits of the <dirInfoCRC> value 439 very efficiently, the remainder of the first level 500 consists of an array 505 of N entries, packed at a bit level. Each entry contains x bits of the <dirInfoCRC> value 439 (beyond the most significant $m_0$ bits) and y bits of the <partialFileCRC> 440. The values x and y are chosen by the Agent 108 (and stored in the global database file header) based on mo and the total number of entries N in the global database 145. Since the entire first level 500 is downloaded, the idea is to trade off the size of the array 505 to minimize the number of accesses required into the second level 502 to validate a match. For example, using N and M from the above example, if we choose x=10 bits and y=0 bits, then the table 505 consists of a total of about 1220K bytes (one million entries at 10 bits each); the entire first level 500 consists of about 1260 K bytes (1220K+ 40K), as opposed to the 16M bytes required for a complete download of the entire database. Since we have $m_0+x=26$ bits of <dirInfoCRC> 439 thus represented by the first level 500, the average probability pf of a false second-level match based on a first-level match is then given roughly by pf $=N/2_{26}$~1/64, assuming (as we are) a random distribution of <dirInfoCRC> values 439 in the database. In other words, when filtering database inquiries at the first level, about 63 of 64 inquiries that match at the first level will result in matches at the second level also, in this example. Since every inquiry into the second level 501 involves a disk access into an entry (e.g., 513) containing the remaining fields of the global database entry, it is important to minimize spurious accesses. Typically a value of $p_f$ in the range 1/16 to 1/256 gives a reasonable tradeoff between search performance and download size. For example, if we increase x to 11 bits in this example, we decrease to $p_f$~1/128 at a cost of about 125K bytes in the size of the first level. Although y=0 in this example, the y bits of <partialFileCRC> 440 can be used to extend the tradeoff range as N becomes very large, or in the unusual case where many files with the same name/time/date/size (i.e., <dirInfoCRC> 439) exist with different file contents (and thus <partialFileCRC> values 440). The Agent 108 determines all these parameters at database creation time based on the statistics of the entries in the database. In the preferred embodiment, $m_0+x$ is always at least 16, meaning that the first level entries contain at least the 16 most significant bits of the <dirInfoCRC> value 439, so that only the least significant 16 bits of <dirInfoCRC> 439 need to be kept in the second level 501 at 508. At the beginning of the backup process, the backup software of the preferred embodiment loads into memory the first level 500 of the global directory database file 145, either from the backup storage means 101 or, to minimize network bandwidth consumption, from cached copy in a directory on a disk local to the node. For each new/updated file to be backed up, a search is performed through the first level database entries to see if there is a match. If no match is found at this level (the "no match" case), there is no matching file anywhere in the database, so the backup proceeds to copy the file contents into the backup data file, which may involve computing differences from the previous file version in the case of an updated file. If a match is found at the first level, the corresponding second-level entry (or entries) is retrieved and compared; if no match is found here, the backup proceeds as in the "no match" case just discussed. The position of the corresponding second-level entry is easily determined, as discussed above, because its ordinal location in the second level is the same as the ordinal the associated first-level entry. If a match is found at the second level, further inquiry into the backup data file containing the <fileInfo> and <fileInfoData> records 408, 436 associated with the file may be necessary in some cases, depending on the size of the file (e.g., <fileCRC> 409 may be needed for large files) and whether the user has enabled the "exhaustive compare" mode, but in most cases a match to the global directory entry at the second level is sufficient to indicate a file match. If it is ultimately determined that a complete match has occurred, the <fileID> 214 included in the <fileEntry> record 207 of the backup directory file for this backup is set to indicate the matching file in the global database, so no file data needs to be saved in the backup data file for this backup, and there is no new <fileIndex> 215 assigned, nor a <fileInfo> section 408 added.

Figure 10:
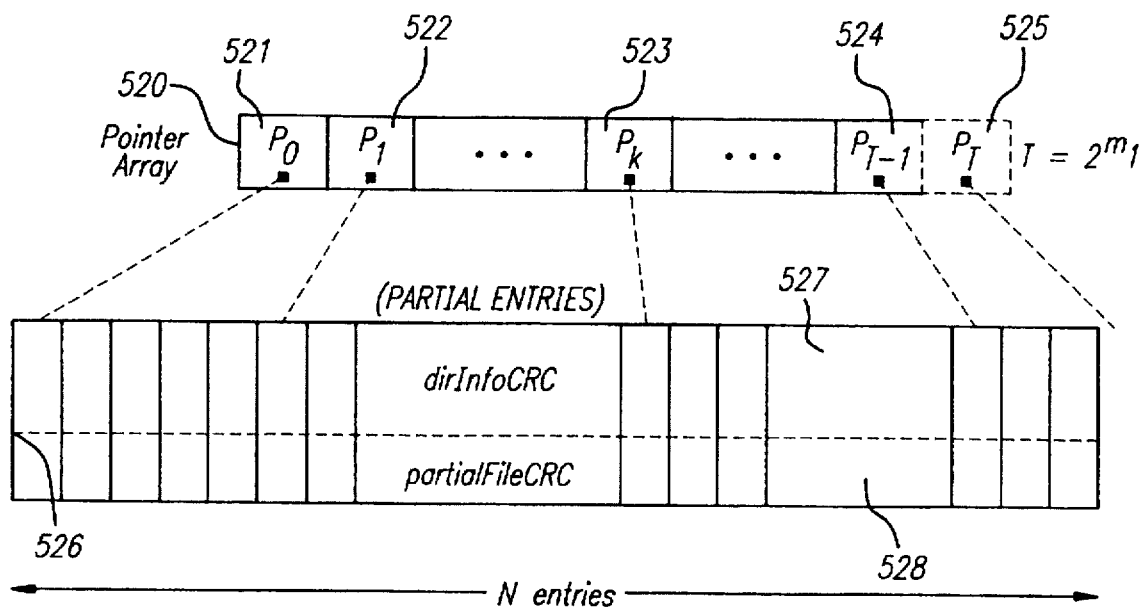
FIG. 10 is a diagram illustrating the data structures used in searching the first level of the global directory database in accordance with the present invention.

The particular first-level search mechanism used in the preferred embodiment is very simple, and there are many other well known search techniques that could be used. The key point here is that, after the first-level data is downloaded, it is all available locally at the node, so there is never a need to access the remote backup storage means 101 to identify first-level matches. In the preferred embodiment, it is assumed that the entire first-level data can fit into main memory during the search process; were this not the case, a virtualized (disk-based) search could be designed, using well known algorithms, that might be considerably slower but would still achieve the same result. The preferred embodiment builds two arrays in memory, as shown in FIG. 10. The main array 526 has N entries, each containing the $x+m_o$ bits (527) of <dirInfoCRC> 439 and y bits (528) of <partialFileCRC> 440 from the first-level entry, sorted in the same order as in the first level of the global database file. In other words, the array 526 is effectively a memory image of the contents of 505. The pointer array 520 consists of $T=2^{m1}$ entries, where $m_1$ is a number of bits chosen based on the total number of global database entries N and the amount of memory available in order to optimize the search process; note that $m_1$ may or may not be equal to $m_0$. Each entry in the pointer array 520 contains a pointer $P_k$ into the main array 526. The index into the pointer array 520 is computed by extracting the most significant $m_1$ bits of the <dirInfoCRC> value 439 for the file in question. For example, $P_0$ 521 points to the first entry in 526, while $P_0$ 522 points to the fifth entry in 526, which in this example is the first entry for which the $m_1$ bits of <dirInfoCRC> 439 in question have the integer value 1. Similarly, $P_k$ 523 points to the first entry in 526 for which the $m_1$ bits of <dirInfoCRC> 439 in question have the integer value k. The count of entries in 526 to be searched for each index k is easily obtained from the difference between successive pointer entries, $P_{k+}-P_k$; an extra "dummy" entry $P_T$ 525, which points just past the end of the main array, is appended at the end of the pointer array 520 in the preferred embodiment so that the same count computation can be performed for the last entry $P_{T-1}$524, without requiring any special case logic.

In the preferred embodiment, entries to be added to the global directory database file 145 are extracted from the backup data files (e.g., 144) by the Agent process 108 as part of the migration of the backup data files from the \BACKUP\USER path (e.g., 125) to the \BACKUP\SYSTEM path (e.g., 129). The Agent 108 first verifies the CRC covering the <fileInfoData> entries 436 in the backup data file to guarantee that no corrupted entries are added to the global directory database. A new global database file 145 may then be created, consisting of the old entries merged with the new entries. In the preferred embodiment, the new database file is initially created by the Agent 108 under a temporary name so that backup processes may continue to use the current database file. Once creation of the new file is completed, its name is changed to a valid global directory database file name which will then be accessed by subsequent backup operations. In the preferred embodiment, the name of global directory database files have the form GDnnnnnn.GDD, where nnnnnn is a number which is incremented each time a new global directory database file is added. For example, the first file would be GD000001.GDD, the second would be GD000002.GDD, etc. Only a small number (typically 1–4) of the most recent versions of such files is retained; older versions are deleted once they are no longer in use. Thus, for example, after some time there might be two files GD000138.GDD and GD000139.GDD stored in the \BACKUP\SYSTEM\GLOBAL directory 127; each time a backup operation begins, the backup process will select the "latest" version of the global directory database file 145 available (GD000139.GDD in this example).

This method of completely rewriting the database allows the optimized search structure discussed above to be maintained, as opposed to a conventional database design (e.g., using B-Tree structures to add new entries). Fortunately, the "batch" mode of operation inherent in backup makes such an approach acceptable in this application. However, once the backup system has been in use for a while, the number of additional entries to the global database for each new backup often becomes a very small fraction of the overall database size, particularly since only new and updated files are added to the database. For example, there might be one million entries in the global database, but a new backup process might add only a few dozen new entries. In this case, rewriting the entire global database can be an extremely slow process, and downloading the new database after each backup could also be slow. To minimize such overhead, in the preferred embodiment, the Agent process 108 may post "update" directory files 147 in the \BACKUP\SYSTEM\GLOBAL directory 127. These update files 147, which are basically identical in structure to the main global database 145, contain only the new entries to be added to the global database. Since some of these update files may be quite small, the Agent 108 may choose to store them in a simplified format with $m_0=0$, $x=16$, and $y=0$, so that there is no count table 502.

In the preferred embodiment, each update directory file is given a file name which links it to the associated "base" global database file; the naming convention is GUxxxnnn.GDU, where nnn is the last three digits of the base global database file name, and xxx is the update number. For example, the file GU003138.GDU would be the third update to the base file GD000138.GDD. Since only a few global database files are retained at any time, the three digits nnn are always sufficient in the preferred embodiment to identify the associated global database file unambiguously.

The backup software usually maintains a simple cache on a local disk of the last global/update directory file(s) downloaded from the backup storage means 101, so it can speed up the database first-level download process. In the preferred embodiment, each update file contains all the updates (i.e., a differential update) to its associated main database file, so the backup process only has to download the most recent update file at any time. In an alternate embodiment, the updates could instead be incremental in nature so that all update files would have to be downloaded, or both incremental and differential updates could be stored, giving more optimization flexibility to the backup software local cache logic. Once the update list reaches a certain size (e.g., 10 percent of the size of the global database) or a certain number of update files (e.g., 500) have been added, the Agent 108 rebuilds an entirely new global database file 145 containing all entries in the main and update database file(s). These particular settings governing how often a new global database file is built are controlled by the backup system administrator on the Agent node 107. Even after building a new global directory database, the Agent 108 may leave the old one(s) around for a while and may even continue adding updates to the old file(s), so that the local cache logic of the backup software may optimize its download strategy. In general, only infrequently does the backup software need to download the first level 500 of an entire global directory database file 145 from the backup storage means 101, thus minimizing the startup time for each backup operation.

1.4. Other Backup Files

FIG. 3 shows several file types other than those discussed above. Most of these files are either redundant (i.e., can be regenerated from other files) or are ancillary at best to the present invention. A brief description of the contents and uses of these files is given here for completeness.

As discussed previously, an Index Range Lookup file (e.g., 151) is built and maintained for each user by the Agent process 108. This file is constructed from the contents of the migrated backup data and backup directory files (e.g., 148, 149). It includes a table indicating the directory/file index ranges of each backup directory and backup data file, respectively. This file is thus entirely redundant and can be thought of as a table of contents for the backup directory/data files. Its contents are organized to allow a quick binary search to determine while file contains a given directory/file index for the user, instead of having to open each file in turn to perform such a search. This file is not encrypted.

The Backup Log file (e.g., 150) is also a redundant file, built and maintained by the Agent 108 for each user. It contains a copy of the "bkupDescription" section of each of the user's backup directory files. This log file is typically used at restore time to present a list of available backups to the user, including the annotation string provided by the user when the backup occurred. Without this file, the restore software would have to open many backup directory files to present such a list, which could be quite slow. The contents of this file are encrypted using the same encryption key applied to the backup directory files.

The User Account Database file 146 is maintained by the backup administrator software. It contains the account records for all authorized backup users. In particular, it contains the list of user names (e.g., JOHN), user directory names (e.g., USER2), <userID> values, as well as encryption and password keys for each user, as will be discussed in a later section. Most of the record associated with each user in this file is encrypted using the user's private password.

The Password Log file (e.g., 140) is used to perform changes of the user password. This operation will be discussed in more detail below, but this file basically allows each user to post a password change "request" to the Agent 108, which will in turn update the user's password and encryption key fields in the User Account Database and re-encrypt the user's backup directory files (e.g., 148).

The Previous Dir file (e.g., 141) contains the directory information from the last backup operation. Its contents are redundant and could be reconstructed from the backup directory files (e.g., 148). However, unlike the backup directory files, the Previous Dir file is not encrypted with a key requiring a user password. Thus, a backup operation can proceed at a pre-scheduled time (e.g., midnight) without requiring the user to type in his password. In the (hopefully rare) event that this file is lost or corrupted, it can be reconstructed, but only after the user enters a password.

The User Preferences file (e.g., 142) contains user selected preferences, such as the values of settable parameters (e.g., $N_u$, $N_D$), the specification for which files are to be excluded from the backup, etc.

It should be noted that all of these files in the system can easily be backed up to tape using any commercially available tape backup package. Because of the read-only nature of most of these files, note that there is little opportunity for user-induced data corruption, unless network security is breached. Thus, tape backup is relegated to a role of catastrophic failure recovery in almost all cases.

1.5. Remote Backup

For a mobile (e.g., notebook computer) or remote (e.g., home office) user, backup is often very problematic. The normal difficulties of enforcing a backup discipline are magnified, both because it is usually undesirable to buy or to carry around a backup device and because connections to a network, when available, are often very low speed (e.g., modem). Yet the data on a remote computer may be as critical as the data on any network node, so backup is equally important. The present invention provides a fairly simple but very effective solution to this problem in many cases.

The basic idea is to use backup over a low speed link to the network, relying on the duplicate file identification methods of the preferred embodiment to eliminate the need to send duplicate files over the link and on the <fprints> records 428 to identify differences between file versions so that only file changes are sent. Typically, it is desirable if possible to perform the initial backup when the remote computer (e.g., 104) is connected directly to the network 106 with a fairly high speed link. Otherwise, the initial download of the first level 500 of the global directory file 145 and the sending of the user-unique files that typically will not change in the future will make the initial backup quite slow. However, in the case where a high speed connection is not possible, the initial backup can still be performed remotely and will usually benefit considerably from the duplicate file identification, although it may require several hours. Typically, subsequent backups can be performed remotely in a matter of minutes. The local caching strategies discussed throughout this specification are clearly critical to performance in this case. In addition, it is helpful to cache the <fprints> sections 428 from the previous backup on a local disk to speed up the differencing operation further, although this functionality is not necessary to the preferred embodiment.

Remote restore operations will be slower than local access, but the time required to restore a few small files is quite acceptable in general. In most cases, a full restore over a remote low speed link is not recommended, because the duplicate file identification is of no help in reducing the download time in the preferred embodiment.

2. Privacy

As has been alluded to previously, a crucial (though somewhat subtle) privacy issue arises due to the ability to identify and reference duplicate files across users. As a simple example, suppose that user #1 has files A, B, and C that are already saved in a backup data file and entered into the global directory database, and that user #2 has files X, B, and Z. When user #2 performs a backup, the backup software will detect the presence of the duplicate file (B) using the techniques discussed above and insert into the backup directory file a <fileID> record 214 referencing user #1's file B. This is all fine; however, notice that in order to find the duplicate file B, user #2 effectively has access to all of user #1's data files, even files A and C, which may be files that user #1 wishes to keep private. Even assuming that the backup software is properly designed not to support user #2 directly in accessing to these non-duplicate files, in the absence of any of the prevention measures discussed in this section, a clever hacker could (with a significant reverse engineering effort) gain access to the contents of all of user #1's files, which are present on the backup data storage means 101 in the backup data files. This type of access must not be allowed in any product, such as the preferred embodiment, that hopes to reassure customers that their private data will remain private. This need for privacy is not just related to personal data kept on a user's workstation; it also often involves critical corporate information such as the status of certain business negotiations, employee salaries, other personnel data, etc.

2.1 Keeping private files private

The present invention includes a simple and novel technique that uses encryption to restrict access to a user's data on a file-by-file basis; in particular, only those users who in fact have (or once had) a valid copy of a file may reference that particular file. The data of each file in the backup set is stored in an encrypted form in the backup data file, where the encryption key is based on a fingerprint (e.g., CRC) of the file's data itself. These "encryption" fingerprints themselves are then stored in the "fileDecryptKey" section of the backup directory file, which is itself encrypted with a key that is accessible to the user only by supplying a password. In addition, as discussed previously, <fileRef> records 426 in a backup data file also contain the <decryptKey> record 427 for a referenced file, but these records are also encrypted, using the encryption fingerprint of the referencing file, to prevent "indirect" access. Thus, users can only successfully decrypt a file's data if they have the correct encryption fingerprint, presumably obtained by computing the fingerprint over their own copy of the file. In this way, a user has access only to encrypted versions of the private files of other users, while at the same time having the ability to decrypt files which are common (and thus not private). In the preferred embodiment, each 64-bit encryption fingerprint is algebraically independent of the <fingerprint> values 430 and is the combination of a CRC and a simple non-linear checksum function over the first 256K bytes of the file contents. One interesting property of this scheme is that, if the "original" owner of a file forgets his password, he will effectively be denied access to his files, while other users can continue to get access to the files they share.

It is also true that a user may wish to keep private the mere existence of a certain file or a name of a file.

Thus, in the preferred embodiment, the <volumeDirInfo> section 200 of each backup directory file (e.g., 143) is also encrypted with the same user-specific key as is used for the "fileDecryptKey" section. Enough information is stored in the backup data file to allow a separate user to gain access to the (encrypted) data portion of a given file without knowing the name of the file, so uninvited users are not able to "peruse" the directory/file tree of another user without knowing his password.

2.2 "Back door" Data Access Policy

The need for data privacy must be balanced in the corporate environment with the right of the company to retain access to its intellectual property (e.g., computer files) in the case of an employee who is unwilling or unable to produce his password. Such cases could easily arise when an employee forgets his password, becomes disgruntled, or is the victim of a disabling or fatal accident. Typically, the current version of the user's data would be available directly from the workstation disk, but there are clearly scenarios where it is critical for the corporation to access the user's backup data sets.

It was initially envisioned that the backup software should allow the user alone to set his password, without any administrative "back door" to the backup set data. However, it was decided that such an approach does not give the corporation the ability to recover its data in any of the "disaster" scenarios mentioned above. Further, it became quickly apparent that there were certain operations, such as changing passwords and consolidating backup sets, which became very difficult or impossible for the Agent process 108 to perform in such an environment. Thus, the preferred embodiment is designed to maintain very high security and privacy between users, but the backup administrator does have the ability to access a user s backup data if necessary.

For a user who insists on maintaining ultimate privacy of certain personal files, there are several options, although some (or all) of these options may be unacceptable to his manager. First, he may opt not to use the backup software of the present invention. Second, he may encrypt the files in question on his local disk using a separate encryption utility. Third, he may exclude the files in question from the backup set. In the preferred embodiment, the administrator has access to each User Preference file (e.g., 142), which contains the exclude/include list so that an audit may be conducted by management of those files and directories which are not being backed up.

2.3 Encryption Key Protocols

In any system using encryption, careful attention must be paid to how the encryption keys are handled, and the present invention is no exception to this rule. This section discusses the generation and use of encryption keys in the preferred embodiment in order to insure privacy.

Figure 11:
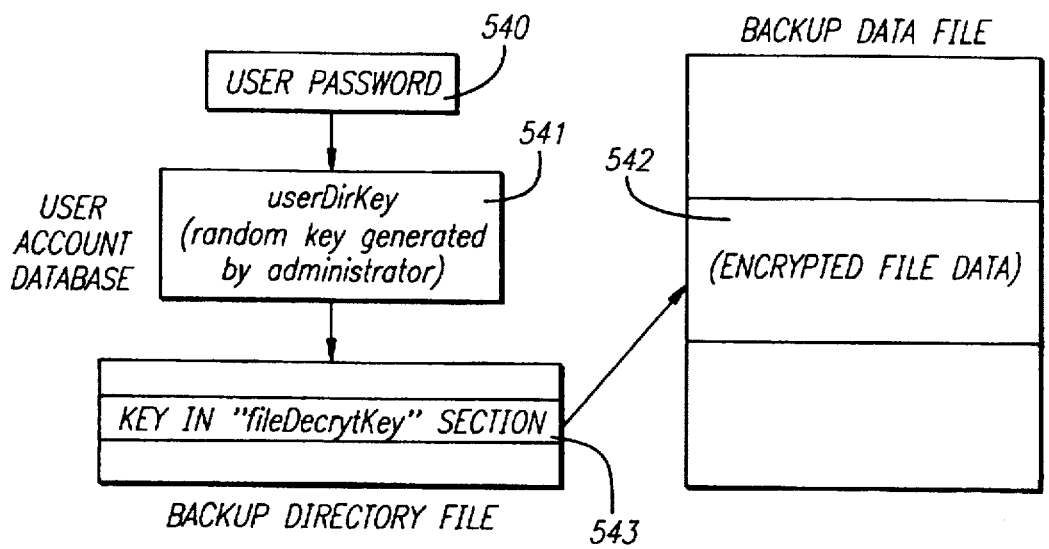
FIG. 11 is a diagram illustrating how user passwords are used to access encryption keys to access backup data in accordance with the present invention.

As shown in FIG. 11, when a new user account is added by the administrator to the backup system of the preferred embodiment, the administrator software generates a user-specific random unique encryption key (userDirKey 541) that will be used to encrypt the user's backup directory files. As we have seen, the "fileDecryptKey" section of these directory files contains the keys 543 (generated from fingerprint functions on the file contents) used to encrypt the file data 542 in the backup data file. The userDirKey 541 is placed in the User Account Database file 146, where it is encrypted according to a user-supplied password 540. This password 540 may be initially supplied by the user to the administrator, or it may be chosen by the administrator and given to the user (normally with instructions to change it upon first use).

The administrator software of the preferred embodiment also stores the user password 540 and the userDirKey 541 in a separate section of the User Account Database file 146 which is encrypted using an administrator password. Actually, what is stored is the encryption key (a message digest in the preferred embodiment) generated from the password, not the password itself. Thus, the administrator has a "back-door" path to decrypt the user's directory files if necessary. In addition, the administrator may configure the Agent process 108 to change the userDirKey value 541 from time to time and re-encrypt all user directory files to guard against the possibility that a hacker has somehow obtained access to the user's password 540 and/or userDirKey 541. Although such a change may require some time to complete, in the preferred embodiment the backup directory files for a user remain "on line" during this operation. This is actually accomplished by storing two userDirKey values (a current and an "old" value) in the account entry for each user in the User Account Database file 146. If a decryption checksum fails using the current userDirKey value, the backup software of the preferred embodiment automatically tries the old userDirKey value instead. Thus, the Agent 108 first sets the old userDirKey value to be the current userDirKey value, then sets the new current userDirKey, and finally proceeds to re-encrypt all the backup directory files. At any time during the re-encryption process, one of the two keys will work.

The user may change his password at any time by posting a password change request in his Password Log file (e.g., 140). This request is encrypted with the current userDirKey value 541 and contains the new password. When the Agent 108 gets around to processing this request, it re-encrypts the user's account entry in the User Account Database file 146 according to the new password and acknowledges the request by updating his Password Log file (e.g., 140). In the interim, the user may to use the new password, because a list of recent passwords is maintained in the Password Log file, encrypted using the latest password. When the user needs access to the userDirKey 541 (e.g., to perform a restore), the software uses the latest password to access userDirKey 541 in the User Account Database 146; upon failure, the password "history" is accessed and old passwords are tried automatically until one works. Thus, the user can change his password several times and continue to work without needing to wait for the Agent 108 to process his change request. Note that CRCs are embedded in these files in all cases to verify that the password is correct. In the worst case of a user forgetting his password or inadvertently deleting his Password Log file while a request is pending, the administrator can easily issue the user a new password.

As an administrator-configurable option in the preferred embodiment, in order to help insure a certain level of security, the backup software may prompt the user to change his password on a periodic basis and check that all passwords have a minimum length (and are not re-used). In an alternate embodiment, as an ultimate back door, it would be possible to have the administrator software keep a log of all user passwords and userDirKey values in a file that is encrypted using a public key algorithm, which only a certified third party has the ability to decrypt. In this case, if the administrator loses the ability to restore passwords, the third party could recover the administrator and user passwords, probably for a considerable fee to cover the cost of checking the legitimacy of the request and to discourage frivolous use of this service.

One goal of the preferred embodiment is to allow the user to perform backups without entering a password. This ability is particularly important in the common case of performing scheduled backups when the user is not present. At the same time, it is clearly desirable to require a password in order to restore data. Fortunately, this feature is easily implemented as follows. During each backup, the backup software posts the backup directory file (e.g., 143), encrypted using a special user-specific key (userPostKey) just for this purpose. The userPostKey value is included in the user account entry (which is encrypted using the user password 540) of the User Account Database file 146; this key may also be stored on the local workstation disk so that it is available without entering a password. As part of the migration of the backup directory file to the \BACKUP\SYSTEM path 122, the Agent 108, which has access to both keys, subsequently re-encrypts this file using userDirKey 541. In the preferred embodiment, there is thus a brief period of time, from when the backup directory file is first posted until the Agent 108 migrates it, when the system is dependent on network security and on the security of the local workstation to maintain the privacy of the backup set, since a hacker could in theory copy the userPostKey from the local workstation and the backup directory file (e.g., 143). It would be possible to overcome this limitation in an alternate embodiment by posting the directory file with a public-key encryption algorithm, using the Agent's public key; such an approach seems overkill, however, particularly in light of the fact that once a hacker has access to the user's workstation (to get the unauthorized copy of userPostKey), the privacy of the backup data set is probably the least of anyone's concerns.

In addition, the backup software maintains the Previous Dir file (e.g., 141), which is also encrypted with userPostKey, and can thus be accessed without a password. This file contains a copy of all the directory information for the most recent backup, allowing identification of unchanged and modified files at the next backup. The software of the preferred embodiment may also retain a cached copy of this file on the local workstation to minimize network bandwidth. Note that, since this file does not contain the encryption fingerprints that are used for encrypting the file data, only a knowledge of directory information (as opposed to the file data encryption keys) would be compromised in the worst case if the contents of the Previous Dir file were somehow compromised. In the rare case where this file is corrupted or deleted, which can be detected by checking CRCs, the backup software of the preferred embodiment rebuilds the Previous Dir file from the previous (encrypted) backup directory file(s), although such rebuilding does require the user to enter his password.

3. Restore Process

The preferred embodiment provides two principal ways of selecting the backup set to be restored. In the conventional method, the user is presented with the list of previous backup operations, each identified with the backup time, date, and description (e.g., from a user's Backup Log file such as 150), from which he selects the desired backup set. In the alternate approach, the user selects a file from the current disk contents and is presented with a list of all previous versions of that file contained in all the backup sets. This list is typically presented as a selectable set of icons on a calendar showing when new versions were backed up. In order to speed up the initial generation of this list once the user has chosen the file, in an alternate embodiment, a <lastVersion> field is added to each <fileEntry> record 207 to provide a direct linked list of all unique versions of each file, as mentioned previously.

In the preferred embodiment, there are two methods of restoring data from the backup storage means 101 once the backup set is selected. The first technique is basically identical to a "conventional" restore operation. The user is presented with a tree of files available for restore, where the directory information is extracted from the associated backup directory file. After the user "tags" the desired files and specifies the restore destination, the restore software retrieves the file contents from the backup data file(s) and writes them to the destination.

The second restore paradigm provides much more flexibility in accessing the data. Once the user selects the backup set, the file set is "mounted" as a read-only disk volume by a special file system driver. This driver is implemented as an installable file system (IFS) in the preferred embodiment; in an alternate embodiment, the disk volume is mounted using a block device driver in which the on-disk format of a normal disk volume is synthesized to match the contents of the backup set. Regardless of its underlying structure, the driver provides all the operating system specific functions necessary to allow any application to access the files. For example, if the user wishes to view a spreadsheet file that was backed up in the associated backup set, once the backup set is mounted he may simply run his spreadsheet program and open the file directly on the mounted volume, without having first to copy the file to a local hard disk; alternately, the user may simply copy any files from the mounted volume to his local hard disk using his own favorite file management application. This approach allows the user to access his backup data in a more intuitive way, using his own tools and applications, instead via a dedicated restore application that is unfamiliar because it is rarely used. It also works around the common problem of inadvertently overwriting the current version of a file when restoring an older version from a backup set using a conventional restore program.

Observe that, because the backup storage means 101 is a random access device, the time required to access any file is comparable to typical disk access times, although it may require a few more seeks to follow <externPtr> references 420. The associated backup directory file is loaded from disk very quickly once the backup set is chosen, after which the access to any particular file anywhere in the backup directory tree involves only reading in the associated <fileInfo> record 408 and accessing the data blocks. Thus, a restore operation in the preferred embodiment is considerably faster in almost all cases than a comparable restore operation from a tape backup system. In particular, file access is fast enough that accessing files on the mounted backup volume is usually imperceptibly slower than accessing the files on the original disk drive! An alternate embodiment can take further advantage of this "real-time" nature of the mounted backup volume by adding driver software logic allowing it to be writable, in which all writes actually are stored in a local transient cache that may overflow onto the local disk. Any writes to this transient cache will be discarded once the volume is unmounted. Such an approach allows the user, for example, to mount a volume and perform a transient "update in place" operation, such as a compilation or a database sort, retrieve the relevant results from the operation, and then unmount the volume; effectively, the user has temporarily taken his disk drive back in time to perform the update operation.

The restore method of the preferred embodiment is also somewhat unique in that, although each backup operation after the initial backup is effectively an "incremental" backup, the image presented for restore contains all files present on the source disk at the time of the backup, and all of these files are accessible in real-time, as discussed above.

The random access nature of the backup storage means 101 allows only file changes to be stored, thus providing great savings in storage cost, while still allowing for real-time access to all files.

Another major benefit accrues to the present invention. Note that, once the system is installed and configured, no administrator interaction is required to perform any backup or restore operation, other than to make sure that there is sufficient free disk space on the backup storage means 101. Assuming that the cost of providing enough disk space is acceptably low, which seems to be the case in practice due to the high levels of data reduction achieved in the preferred embodiment, the backup system has a very low maintenance cost. By comparison, most tape backup systems require operator intervention to change tapes periodically and to mount a tape for a given restore request; even with (expensive) tape or optical disk jukebox hardware, such operations seem almost primitive in contrast with the real-time nature of the present invention.

Note that, in an alternate embodiment, the present invention can also be applied to a single computer. In this case, the backup storage means 101 might be a section of the local hard disk, or a removable disk device (e.g., Bernoulli, Syquest), or a portion of a network disk volume. The advantages of duplicate file identification probably are not significant in this instance, but all the other considerable benefits discussed still apply. The Agent process 108 could be run as a background process on the single computer, with the user acting as the backup administrator, or the Agent functions could be configured to run automatically as part of each backup operation.

4. Agent Functions

The Agent process 108 runs on a node 107 on the network 106, typically as a background task on a desktop PC, but it may also run as a software task on the file server 100. The backup administrator configures the Agent process 108, both in its location and performance characteristics, which are quite scalable, as described below. These settings may be varied over time as use of the backup system evolves. For example, in a backup system with only a few users, the Agent process 108 may run as a background task on the administrator's own desktop PC. As more users are added and the Agent process 108 requires more time, the administrator may opt to dedicate a PC on the network to run the Agent process 108. Eventually, it may make sense to install a backup file server dedicated solely to backup, including running the Agent process 108, which then can access the backup storage means 101 as a local disk volume instead of over the network. It is fairly simple in the preferred embodiment to change how often and where the Agent process 108 runs in order to meet the needs of the backup clients.

In addition to the migration and other Agent functions discussed above, there are some other concerns that must be addressed by the Agent software. For example, there is a potential problem with backup "clients" that crash during the middle of a backup operation. Similarly, the Agent 108 itself could crash during a migration or consolidation (discussed below) operation. Both the application and Agent software are robust enough in the preferred embodiment to detect such conditions and respond properly, including the ability to "clean up their own mess" the next time they are run. A few other such issues are discussed briefly below.

With a little thought, it becomes clear that there is a small problem in the preferred embodiment which, if ignored, might cause a backup operation to fail to identify some duplicate files and thus slightly affect storage requirements. If two users are performing backups concurrently (or actually if one starts before the other's backup files have been migrated by the Agent 108 from the \BACKUP\USER path 121 to the \BACKUP\SYSTEM path 122), neither user will be able to identify duplicate files from the other. This is probably of most concern during the "initialization" period that occurs when the first few users are running their initial backup, though the problem never goes away entirely. The workaround for this problem in the preferred embodiment is to have the Agent 108 perform some additional duplicate file "elimination" as part of the migration process. This can be done without modifying the contents of the backup directory files; instead, the <fileInfo> entry 408 for a duplicate file is changed to contain a single <externPtr> reference 420 encompassing the entire file. For performance reasons, this activity might actually be deferred until a later time, such as the middle of the night, when the network should have less traffic. It is possible in practice that this problem simply isn't significant enough to worry about, particularly if the administrator "primes the pump" after installation by having a few representative nodes perform their initial backups sequentially to build up the initial global database. Thus, in the preferred embodiment, the administrator can disable this functionality.

In some cases, a user may wish to delete certain backup sets, typically to save space on the backup storage means 101. For example, the user may decide to merge old daily backups into weekly (or monthly) backups after a few months have passed. Because of the duplicate file identification and file differencing of the preferred embodiment, the resulting disk savings are usually fairly small. In the preferred embodiment, the backup application posts a file requesting the Agent 108 to perform the deletion, which may involve consolidating several backup sets into a single backup directory/data file set in order to retain copies of any file and directory entries that are referenced by the remaining backup sets, either of this user or other users. This consolidation operation may be best deferred until a non-busy time on the network. Completion of the consolidation operation may also have to be deferred until no users have a backup set mounted that contains a reference to the file(s) in questions. Observe that the use of indices (instead of direct pointers) both for file and directory references greatly simplifies such an operation; such consolidation could still be performed without this extra level of indirection, but it would in general involve time-consuming changes to many of the remaining backup files, instead of the creation of the single "stub" backup file set that results in the preferred embodiment.

5. Administrator functions

The backup administrator, who may or may not be a network administrator, has several functions to perform in the preferred embodiment. It is intended that these functions be largely transparent, with most effort being expended at installation time, but from time to time other decisions and actions may become necessary.

5.1 Installation

The backup administrator should install the backup software on the Agent computer 107 (which may be his own desktop) and should set up the network directory structure (e.g., \BACKUP\SYSTEM 122 and \BACKUP\USER 121) where the backup files are to be stored. Setting up the initial directory structure and access rights may involve some help from a network administrator, depending on the network access rights of the backup administrator.

The backup software is distributed on either CD-ROM or floppy disk, but in general only the backup administrator will ever have to use the distribution media, since the software of the preferred embodiment installs itself on the network in such a way to allow users to run a SETUP program from the network. To as large an extent as possible, the installation is automated: the administrator only has to inform the installation software where the \BACKUP directory 120 is located, and the software installs itself.

5.2 Adding new users

With the backup software installed, before a user can actually perform any backups, the administrator must set up an "account" for the user in the User Account Database 146. This is important for two reasons. First, each user must have his own directories (e.g., 125, 129) and a unique <userIndex> number which is crucial in identifying files that are shared across users. Second, keeping an account database allows the administrator to limit access to the system and to meter use of the software according to the terms of his license.

As part of adding a new user account in the preferred embodiment, the administrator software creates the user directories with appropriate access rights (again, this may require network administrator rights). Each user is also assigned a unique user name chosen by the Administrator, such as JOHN, and a unique 16-bit <userIndex> (which the user never needs to know directly). This information, together with the unique user directory name (e.g., USER2), which is based on the <userIndex> instead of the user name in the preferred embodiment, is written to the User Account Database 146, which is read-only for all users. Note that, although the presence of this User Account Database does allow a hacker to determine the <userIndex> and directory name of any user (with some reverse engineering, since those two fields, while not encrypted, are not stored in the clear in the preferred embodiment), such knowledge does not compromise the privacy of the user's data in any way other than perhaps a knowledge of the frequency and size of backup sessions, assuming the user's password is not compromised. The administrator also assigns the user an initial password which is used to encrypt private fields of the user's account, such as the userDirKey and userPostKey values. In the preferred embodiment, the user account entry is duplicated in the User Account Database 146, encrypted with the administrator's password, so that the keys will not be lost if the user forgets his password.

The administrator next informs the user, usually via e-mail, that his account is now active, giving him the assigned user name and (temporary) password. The user then runs the SETUP program from the \BACKUP\SYSTEM\GLOBAL directory, which under Microsoft Windows 3.1 may be effected by attaching a .EXE file to the e-mail message so that the user can simply double-click the icon. The user enters his account name and password, and the software sets up a personal backup directory (typically on the user's local hard disk) and copies over any necessary files to that directory. This personal directory is also used for caching certain files, such as the Previous Dir file (e.g., 141), in order to minimize network bandwidth consumption. Note that it is possible (and probably desirable), if the user so chooses, to copy only a minimum set of program files locally, so that the user always runs the latest copy of the software from the network. Alternately, the software checks its version against that on the network to make sure that it is the latest and ask the user for permission to upgrade when a new version is detected.

The user may also be asked to change his personal password during the initial installation. During the SETUP procedure, the user will be queried to enter any relevant personal preferences, such as how often to schedule periodic backups and where the personal backup directory should be located. These preferences, along with the user name and <userIndex>, are stored in the User Preferences file (e.g., 142). Most preferences may be changed later.

5.3 Overseeing the Agent

The Agent task in general runs in the background without any supervision. However, circumstances may arise (such as a system crash) that could require some intervention by the administrator to restart the Agent process 108. It is intended that the Agent 108 in general be able to recover from most problems that arise, but it is probably not possible to guarantee complete recoverability. The Agent process 108 of the preferred embodiment generates a log file of its activities that the administrator can review. The administrator also has a monitoring application that can perform some simple checks to make sure that the Agent 108 is performing its tasks on a timely basis and in a reasonable fashion, giving warnings upon observing any activity (or lack thereof) that appears suspect.

The invention has been described in an exemplary and preferred embodiment, but is not limited thereto. Those skilled in the art will recognize that a number of additional modifications and improvements can be made to the invention without departure from the essential spirit and scope. The scope of the invention should only be limited by the appended set of claims.

We claim:

1. A method for backing up data files stored on a disk volume of a node of a computer network to a backup storage means, said backup storage means containing data files already backed up from other nodes on said computer network, said method comprising the steps of:

searching through a list of said files already backed up from said other nodes onto said backup storage means for a match to files to be backed up from said disk volume;

operative when no match is found between a file to be backed up from said disk volume and any of said files already contained in said list, storing on said backup storage means a complete representation of the contents of said file to be backed up, computing an index that indicates the location on said backup storage means of said complete representation, and adding to said list an entry describing said file to be backed up from said disk volume;

operative when a match is found between a file to be backed up from said disk volume and a file already contained in said list, computing an index that indicates the location on said backup storage means of a complete representation of the contents of said file already contained in said list, said index capable of indicating files previously backed up from said other nodes;

storing a data structure specifying a portion of the directory structure of said disk volume at the time of the backup operation, said data structure including, for each said file backed up from said disk volume, said index indicating the location of said complete representation, either of said file to be backed up or of said file already contained in said list, depending on the outcome of said search through said list; and so that a file on another node that is duplicated on said disk volume may be identified so that only one copy of the contents of said file is stored on said backup storage means.

2. The method of claim 1 in which the step of storing said complete representation of the contents of said file to be backed up further includes the step of:

operative when a previous version of said file has already been backed up from said node to said backup storage means. computing the differences from the previous version of said file. representing portions of the contents of said file to be backed up using indices into the representation of said previous version on said backup storage means.

3. The method of claim 2 in which the existence of said previous version of said file is detected using a previously saved data structure specifying the directory structure of a previous backup operation, and in which said differences between said versions are computed using an index contained in said previously saved data structure, to a complete representation of the contents of said previous version of said file.

4. The method of claim 3 in which the steps of storing said complete representation of the contents of said file to be backed up further includes the step of compressing portions of said representation using a lossless data compression algorithm before storing said representation on said backup storage means.

5. The method of claim 4 in which the step of storing said complete representation of the contents of said file to be backed up further includes the step of encrypting portions of said complete representation using an encryption key that is derived by computing a hash function on the contents of said file to be backed up.

6. The method of claim 5 in which said encryption key is stored as part of said data structure specifying the directory structure of said disk volume.

7. The method of claim 1 in which the step of storing said complete representation of the contents of said file to be backed up further includes the step of encrypting portions of said complete representation using an encryption key that is derived by computing a hash function on the contents of said file to be backed up.

8. The method of claim 7 in which said encryption key is stored as part of said data structure specifying the directory structure of said disk volume.

9. The method of any of claims 5–8 in which the step of storing said data structure specifying said structure of said disk volume further includes the steps of compressing portions of said data structure with a lossless data compression algorithm; and encrypting said encryption key using an encryption key that is private to said node on said computer network.

10. The method of any of claims 1–8 in which the said list of said files already contained in said backup storage means is organized as a database in order to minimize search time.

11. The method of claim 10 in which each entry in said database includes a hash function computed on the directory entry information for the file associated with said entry, including the file name, length, and time of creation, and a hash function computed over portions of the contents of said file.

12. The method of claim 11 in which said search of said database includes the following steps:

loading a first section of said database, said first section containing partial entries, each partial entry containing only a portion of an entry of said database;

generating a new database entry of said file to be backed up; and searching through said first section for a match between said new database entry and said partial entries and, operative when a match is found between said new database entry and a partial entry of said first section, loading the remaining portions of said matching partial entry from the associated entry in a second section of said database, and comparing said new database entry with said remaining portion of said associated entry to determine whether there is a complete match between said new database entry and the complete database entry.

13. The method of claim 12 in which said first section of said database is stored in a sorted order based on bit fields of said partial entries and is compressed with a lossless data compression algorithm.

14. The method of claim 13 in which said lossless data compression algorithm includes storing an array indicating how many consecutive entries in said sorted first section have bit fields of each possible value of said bit fields, and in which the rest of said first section omits said bit fields from the remainder of said partial entries.

15. The method of any of claims 1–8 in which the contents of a particular backup operation are mounted as a restored disk volume having a directory structure identical to that of the original disk volume at the time of said backup operation, whereby said files on said restored disk volume may be accessed from a software application that uses normal file system input/output calls.

16. The method of claim 15 in which said restored disk volume is accessible on a read-only basis.

17. The method of claim 15 in which said restored disk volume is accessible for reads and writes, all writes to said restored disk volume being cached in a transient storage means, the contents of which are discarded when said restored disk volume is unmounted.

18. The method of any of claims 2–8 in which the differences between said file to be backed up and said previous version of said file are computed using a probabilistic algorithm, including the following steps:

at the time when said previous version was backed up, storing on said backup storage means a set of hash function values computed on fixed size chunks of said previous version;

at the time of said backup, loading said previously stored hash function results;

comparing said hash function results from said previous file version to hash function results computed on fixed size chunks of said file to be backed up; and operative when a chunk of said file to be backed up has the same hash value as a chunk of said previous file, representing said chunk of said file to be backed up by an index indicating said matching chunk of said previous version.

19. The method of claim 18 in which said comparison of said hash function results includes sliding the hash function computation from byte to byte within said file to be backed up, whereby matching chunks in said file to be backed up may be found on any byte boundary in said file to be backed up, and not solely on chunk boundaries.

20. The method of claim 19 in which said hash function includes computation of a cyclic redundancy check (CRC).

21. The method of claim 18 in which the contents of a particular backup operation are mounted as a restored disk volume having a directory structure identical to that of the original disk volume at the time of said backup operation, whereby said files on said restored disk volume may be accessed from a software application that uses normal file system input/output calls.

22. The method of claim 21 in which said restored disk volume is accessible on a read-only basis.

23. The method of claim 22 in which said restored disk volume is accessible for reads and writes, all writes to said restored disk volume being cached in a transient storage means, the contents of which are discarded when said restored disk volume is unmounted.

24. A method for backing up data files stored on disk volumes on nodes of a computer network to a backup storage means, comprising the steps of:

backing-up data files stored on one or more disk volumes of one or more nodes of said computer network to said backup storage means and, after backing-up said data files, generating a list describing said data files that have been backed-up from said disk volume of said node;

backing-up data files stored on another, further disk volume of another, further node of said computer network which has not yet been backed-up, comprising the steps of:

searching through said list of said files already backed up from said other disk volumes of said other nodes for a match to files to be backed up from said further disk volume of said further node;

operative when no match is found between a file to be backed up from said further disk volume of said further node and any of said files already contained in said list, storing on said backup storage means a complete representation of the contents of said file to be backed up, computing an index that indicates the location on said backup storage means of said complete representation, and adding to said list an entry describing said file to be backed up from said further disk volume of said further node;

operative when a match is found between a file to be backed up from said further disk volume of said further node and a file already contained in said list, computing an index that indicates the location on said backup storage means of a complete representation of the contents of said file already contained in said list, said index capable of indicating files previously backed up from said other nodes; and storing a data structure specifying a portion of the directory structure of said disk further disk volume of said further node at the time of the backup operation, said data structure including, for each said file backed up from said further disk volume of said further node, said index indicating the location of said complete representation, either of said file to be backed up or of said file already contained in said list, depending on the outcome of said search through said list; and so that a file on a disk volume of a node previously backed-up that is duplicated on said further disk volume of said further node may be identified so that only one copy of the contents of said file is stored on said backup storage means.

* * * * *